United States Patent
van den Berg et al.

(10) Patent No.: US 12,407,517 B2
(45) Date of Patent: Sep. 2, 2025

(54) SECURE PIN ENTRY USING A VIRTUAL TERMINAL

(71) Applicant: Apple Inc., Cupertino, CA (US)

(72) Inventors: Frank Andries van den Berg, San Jose, CA (US); Rahul Narayan Singh, Santa Clara, CA (US); Neilson Proulx-Marcil, Montreal (CA); Jean-Francois Riendeau, Granby (CA); Mamta Devi, Montreal (CA)

(73) Assignee: Apple Inc., Cupertino, CA (US)

( * ) Notice: Subject to any disclaimer, the term of this patent is extended or adjusted under 35 U.S.C. 154(b) by 165 days.

(21) Appl. No.: 18/374,414

(22) Filed: Sep. 28, 2023

(65) Prior Publication Data
US 2025/0112778 A1    Apr. 3, 2025

(51) Int. Cl.
 H04L 9/32    (2006.01)
 G06F 21/72   (2013.01)
 H04L 9/08    (2006.01)

(52) U.S. Cl.
 CPC ............ H04L 9/3226 (2013.01); G06F 21/72 (2013.01); H04L 9/0825 (2013.01)

(58) Field of Classification Search
 CPC ..... H04L 9/3226; H04L 9/0825; G06F 21/72; G06F 21/606; G06Q 20/3823; G06Q 20/3829; G06Q 20/3227; G06Q 20/4012; G07F 7/1025; G07F 7/1033; G07F 7/1091; G07F 7/1016
 See application file for complete search history.

(56) References Cited

U.S. PATENT DOCUMENTS

| | | | |
|---|---|---|---|
| 8,219,826 B2 * | 7/2012 | Perkins ................. | G07F 7/1025 713/184 |
| 9,646,306 B1 * | 5/2017 | Quigley .............. | H04W 12/128 |
| 2005/0274796 A1 * | 12/2005 | Miyashita ............... | G06F 21/31 235/382 |
| 2007/0125847 A1 * | 6/2007 | Millett .................... | G06F 21/31 235/382 |
| 2011/0055586 A1 * | 3/2011 | Lupton ................. | G07F 7/1091 713/184 |
| 2015/0227930 A1 * | 8/2015 | Quigley ................ | H04L 9/3013 705/72 |
| 2016/0357952 A1 * | 12/2016 | Kaplan ...................... | H04L 9/00 |
| 2017/0213426 A1 * | 7/2017 | Schwartz .............. | G07F 7/1091 |
| 2020/0379621 A1 * | 12/2020 | Sartori .................. | G06F 3/0488 |
| 2021/0383386 A1 * | 12/2021 | Abrams ............. | G06Q 20/3272 |
| 2023/0251885 A1 | 8/2023 | Hudon-Voyer et al. | |
| 2024/0144285 A1 * | 5/2024 | Yahalom ............ | G06Q 20/4012 |

OTHER PUBLICATIONS

International Patent Application No. PCT/US2024/033142, "International Search Report and Written Opinion", Aug. 22, 2024, 13 pages.

* cited by examiner

Primary Examiner — J. Brant Murphy
(74) Attorney, Agent, or Firm — Kilpatrick Townsend & Stockton LLP

(57) ABSTRACT

Techniques for using a virtual terminal on a multipurpose device for PIN entry to authorize a data transfer are described herein. These techniques provide the secure receipt of each PIN digit by the device and encryption of the PIN multipurpose device and while the PIN entry data is transferred, while still providing the information to a server for further processing.

20 Claims, 8 Drawing Sheets

SECURE PIN ENTRY USING A VIRTUAL TERMINAL

CROSS-REFERENCES TO RELATED APPLICATIONS

This application is related to U.S. patent application Ser. No. 18/374,414, filed concurrently herewith entitled, "SECURE PIN ENTRY USING A VIRTUAL TERMINAL," the contents of which are herein incorporated by reference.

BACKGROUND

Electronic devices, especially portable electronic user devices, are quickly becoming ubiquitous in every modern society. Such devices can be used as terminals to transmit data with one another. Transmitted data can require encryption and decryption to protect sensitive data, including a personal identification number (PIN).

DETAILED DESCRIPTION

Figure 1:
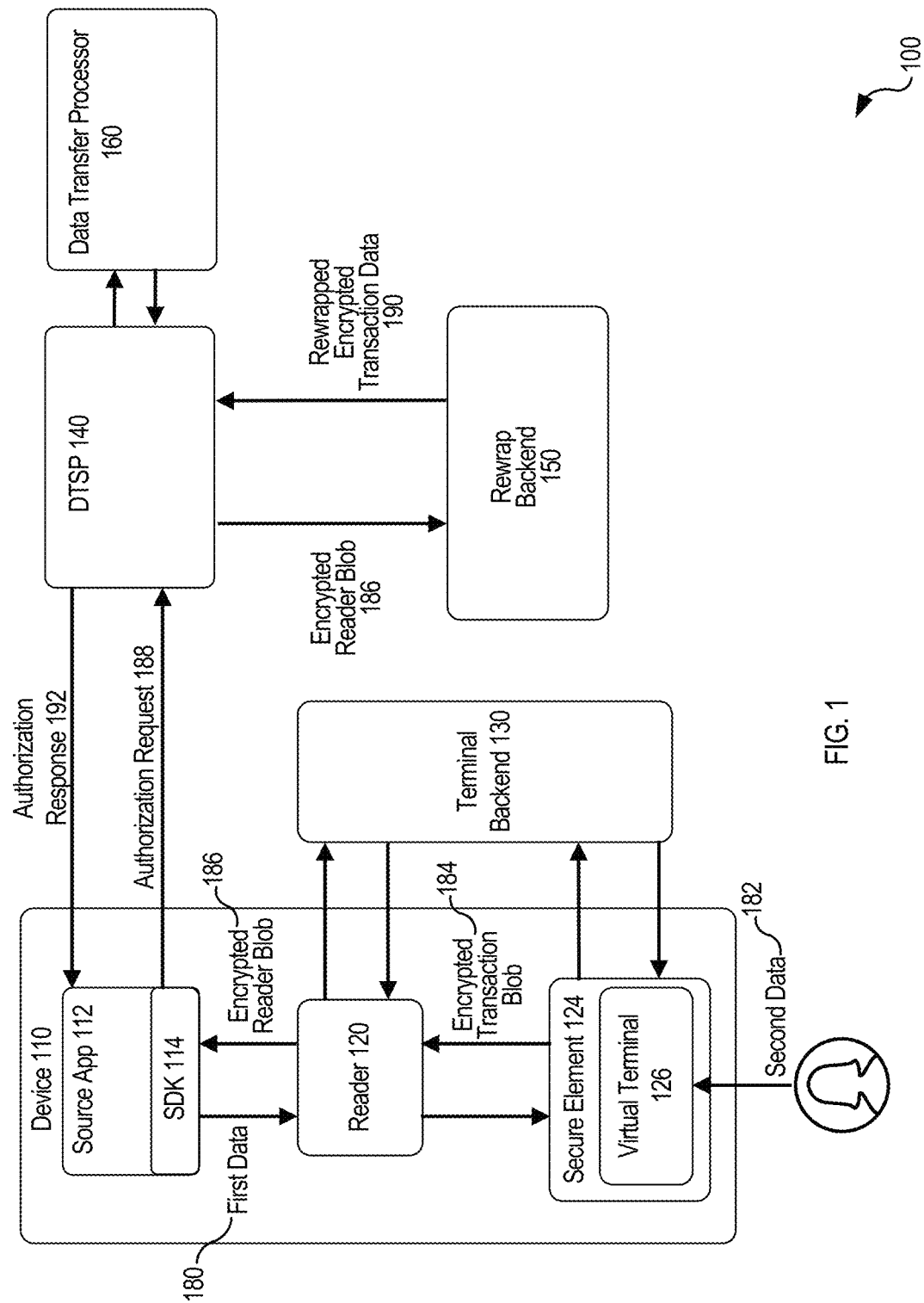
FIG. 1 illustrates a block diagram for performing the techniques described herein, according to an embodiment of the present disclosure.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described.

Examples of the present disclosure are directed to, among other things, methods, systems, devices, and computer-readable media that provide techniques for secure personal identification number ("PIN") entry with a data transfer using a virtual terminal hosted by ("e.g., executed within) a secure element of a user device. Unlike conventional PIN entry, the techniques described herein enable a virtual terminal to securely encrypt both the data transfer information and the PIN for transmission on a multipurpose device (for example, a mobile device, a smart phone, tablet, etc.). A system including the virtual terminal can be configured to include a reader application (for example, a data reader application which serves the operating system of the multipurpose device as a hub for received information that can be used by data transfer-related applications and the secure element), an internal short-range data transceiver device (for example, an internal data reader such as a near-field communication ("NFC") chip) and a secure element. The short-range data transceiver device may not be a component of an externally connected device (for example, a dongle), but rather can be integrated into the multipurpose device. The multipurpose device may also include a secure element, e.g., a closely integrated hardware module designed for data security. The secure element may host the virtual terminal and encrypt the PIN (and related information) and data transfer information. The secure element may also not be a component of an externally connected device (for example, a dongle).

The techniques described herein provide for a mobile contactless data transfer device solution that allows users to accept data transfers and enter an associated PIN using a multipurpose device (for example, a mobile device, a smart phone, tablet, etc.). Conventional PIN entry systems require dedicated devices and/or hardware separate from the multipurpose device (for example, a dongle or terminal device). The virtual terminal is configured to support a software-based terminal on the multipurpose device that removes the need for dedicated devices and/or hardware for PIN entry and data transfers. Additionally, some conventional PIN entry systems will also translate the digits of the PIN into a proprietary format for data security. However, information regarding the proprietary format is needed by a data transfer service provider to decrypt the PIN. The techniques described herein enable the data transfer service provider and the data transfer processor to receive the PIN in a plain format that can be easily used. A source application can, in conjunction with a reader application, facilitate the receipt of data for a data transfer transaction. The data transfer transaction may include a PIN as a data security protection. The mobile data transfer techniques can be enabled via (1) a third-party mobile data transfer application (the source application) that integrates with a first-party (for example, corresponding to the specific device) data reader application on an application processor of the source's eligible mobile device using one or more application programming interfaces ("API(s)") (collectively, the frontend integration) and (2) third-party data transfer systems that integrate with a backend platform (the backend platform) using APIs (collectively, the backend integration). Two separate suites of APIs can be provided: one for the third-party developers of source applications and one for the data transfer service providers ("DTSP(s)") that contract with the developers of source applications to facilitate the processing of transactions. The source application can be source-facing and enable sources to accept contactless data transfers from users using either digital or physical closed loop transaction instruments or open loop data transfer instruments.

In some examples, PIN digits can be received through a PIN user interface ("PIN UI") and received by the data reader application on an application processor of the multipurpose device. A first PIN digit can be received by the PIN UI and sent to the data reader application. The data reader application may store the first PIN digit in a first memory location and encrypt the first PIN digit with a public key. The public key may correspond to a private key stored in and used by the secure element. The data reader application may send the encrypted first PIN digit to the secure element. Likewise, second PIN digit can be received by the PIN UI and sent to the data reader application. The data reader application may store the second PIN digit in the same first memory location and encrypt the second PIN digit with the public key. By using the same memory location, the data reader application may prevent multiple PIN digits from being stored in unsecured memory (for example, device memory such as RAM or storage) simultaneously. Because the second PIN digit is saved into the same memory location as the first PIN digit, the value of the first PIN digit is written over by the value of the second PIN digit in the memory location. Likewise, each PIN digit of the PIN can be stored in the same first memory location when received. This increases data security of the PIN as multiple PIN digits and/or the entire PIN will never be stored in unsecured memory.

The secure element can decrypt each PIN digit using the private key corresponding to the public key. The secure element can also receive instrument information for the data transfer. The secure element can generate a PIN block including any combination of the PIN, the instrument information, and a symmetric transaction key. The symmetric transaction key can be encrypted by a rewrap backend public key to generate an encrypted transaction key. The rewrap backend public key can correspond to a rewrap backend private key known by a backend platform associated with the data transfer. The secure element can generate a PIN blob from the PIN block, the encrypted transaction key, and other metadata. The secure element can send the PIN blob to the data reader application. The data reader application can encrypt the PIN blob using a transport server key to generate a reader PIN blob. The reader PIN blob can be sent by the data reader application to the source application. The source application can send the reader PIN Blob to the DTSP.

The DTSP may be unable to decrypt the reader PIN blob because the DTSP may not have the transport server key and the rewrap backend private key corresponding to the rewrap backend public key. The DTSP may forward the reader PIN blob to the backend platform. The backend platform may have the transport server key and can decrypt the reader PIN blob. After decrypting the reader PIN blob, the backend platform has the PIN block, the encrypted transaction key, and other metadata. The backend platform can verify the other metadata to authenticate the PIN block. The backend platform can have the rewrap backend private key and can decrypt the encrypted transaction key. The decrypted transaction key can then be reencrypted (also referred to as rewrapped) using a key encryption key ("KEK") that was shared between the hardware security module in the DTSP's data transfer system ("DTSP HSM") and a corresponding hardware security module of the backend platform. The reencrypted transaction key can be referred to as the rewrapped transaction key. The backend platform can generate a rewrapped PIN blob from the PIN block and the rewrapped transaction key. The backend platform can send the rewrapped PIN blob to the DTSP, where the DTSP HSM can decrypt the rewrapped transaction key using the KEK of the DTSP HSM corresponding to the KEK of the backend platform.

The DTSP HSM can reencrypt the decrypted transaction key using a data transfer processor (DTP) KEK to generate a DTP rewrapped transaction key. The DTSP can send the PIN block and the DTP rewrapped transaction key to a data transfer processor. The DTP can have a DTP KEK that was shared between the DTSP HSM and a corresponding DTP hardware security module (DTP HSM). The DTP can decrypt the DTP rewrapped transaction key using the DTP KEK. The DTP can then use the transaction key to decrypt the PIN block and can confirm that the PIN is correct and authorize the associated data transfer.

Information pertaining to the source's day-to-day business operations (for example, user authorizations and transaction histories) would be transmitted directly from the DTSP's data transfer system to the source application and may not go through the backend platform.

Turning now to the figures, FIG. 1 illustrates an example block diagram 100 with example systems and components for implementing the virtual terminal techniques described herein. The device 110 (also referred to as the multipurpose device) includes a source application 112 (for example, an application) which interacts with an SDK 114 in order to send first data 180 to the reader 120 (also referred to as the reader application). The reader 120 can be a part of the operating system of the multipurpose device configured to receive information that can be used by data transfer-related third-party applications and the secure element. For example, the reader 120 can request information from the secure element on behalf of third-party applications (for example, the source application 112). Additionally, the reader can transmit information received from different communication methods on the device to the secure element and/or third-party applications. For example, information received through a UI interface of the device or a transmission standard (for example, NFC, Bluetooth, WiFi, cellular connections, and the like) can be used to transmit information to the secure element and/or third-party applications. Prior to the receipt of the first data 180, the reader 120 can interact with the terminal backend 130 to initialize a virtual terminal 126. The virtual terminal 126 is hosted within a secure element 124. Any service or application, including the virtual terminal 126, that is hosted within a secure element 124 uses the processors and memories associated with the secure element 124. As such, the application processors and memories of the user device 110 may not be used by an application or service hosted by the secure element. The data and information of any service or application being hosted by the secure element can have data secured as described in relation to the secure element. The secure element 124 is a system designed for increase security as described herein. For example, the secure element 124 is a hardware module that specially designed for cryptography and data security of private and/or confidential data. The secure element can be a hardware chip that runs a specific set of programs/applications, stores private and/or confidential data, and provides controlled access to the private and/or confidential data. The secure element can provide the following set of features at a hardware level: 1) detection of backing and/or data tampering attempts, 2) creation of a Root of Trust (RoT) platform for encryption and data security systems, 3) provision of secure memory for storing private encryption keys and private and/or confidential data, 4) cryptographically secure generation of random numbers, 5) generation of keys such as pairs of private and public keys for asymmetric encryption, and 6) secure monitoring of system resources such as detection of hardware configuration changes. The secure element 124 is separate from an application processor of the device 110. The secure element 124 receives the second data 182 which can detail how the data transfer can be provided to the source associated with the source application 112.

The virtual terminal 126 can generate transaction data using the first data 180 and the second data 182. In some examples, the transaction can be referred to as the data transfer. As described herein, the terms can be interchangeable in some instances. The secure element 124 (and the virtual terminal 126) can also communicate with a terminal backend 130 for various security and encryption features described herein in order to encrypt the transaction data. In some implementations, the secure element 124 communicates with the terminal backend 130 via the reader 120 wherein the communications are encrypted. The virtual terminal 126 can encrypt the transaction data using a transaction key only known by the virtual terminal 126 and/or the secure element 124. For example, the transaction key can be randomly generated at the time of the transaction by the virtual terminal 126. The transaction key is then encrypted by a rewrap backend public key (which corresponds to a rewrap backend private key held by the terminal backend 130 and/or the rewrap backend 150) as described herein. Thus, virtual terminal 126 has a transaction key encrypted by a rewrap backend public key and transaction data encrypted by the transaction key. The virtual terminal can generate an encrypted transaction blob 184 from the encrypted transaction key and the encrypted transaction data. The encrypted transaction blob 184 can include additional metadata. The use of the encrypted transaction blob 184 can prevent transaction data from being exposed outside the secure element 124 before the DTSP 140 can process the transaction data.

The virtual terminal 126 can then send the encrypted transaction blob 184 to the reader 120. The reader 120 can include additional metadata about the data transfer which is encrypted using a transport server key as described herein. The encrypted metadata (using the transport server key) and the encrypted transaction blob 184 are used to generate an encrypted reader blob 186. In some implementations, the encrypted transaction blob 184 can also be encrypted by the transport server key. The use of the encrypted transaction blob 184 can allow the rewrap backend 150 to verify the encrypted metadata to validate the transaction data without decrypting the transaction data encrypted by the transaction key. In some implementations, the combination of the reader 120, the secure element 124, and the virtual terminal 126 can be referred to as a virtual terminal system.

The reader 120 can send the encrypted reader blob 186 to the source application 112. The source application 112 can send the encrypted reader blob 186 with an authorization request 188 for the transaction to the data transfer service provider (DTSP) 140. The DTSP 140 may not be able to decrypt some or all of the encrypted reader blob 186 and sends it to the rewrap backend 150 for decryption. In some implementations, the rewrap backend 150 can decrypt the encrypted metadata of encrypted reader blob 186 using the transport server key (which corresponds to the transport server key) and verify various portions of the metadata in order to verify that the encrypted reader blob has been authorized by the DTSP 140, the source application 112, and/or the terminal backend 130 as described herein. This allows the rewrap backend 150 to verify the transaction and/or data transfer corresponding to the encrypted reader blob 186 (and associated encrypted transaction blob 184) without seeing the underlying unencrypted transaction data. This can ensure the privacy of the underlying transaction data as the source application 112 and rewrap backend 150 never unencrypt the transaction data encrypted by the transaction key. In some implementations, the rewrap backend 150 can also decrypt the encrypted transaction blob 184 inside to verify and validate various portions of additional metadata and transaction data.

Once the rewrap backend 150 has verified the metadata of the encrypted reader blob 186, the rewrap backend 150 can reencrypt the transaction key with a KEK, a symmetric key known by the DTSP such that the DTSP can decrypt the transaction key (using the KEK) and in turn decrypt the transaction data (using the transaction key). However, the transaction key is currently encrypted by the rewrap backend public key. The rewrap backend 150 can decrypt the transaction key using the rewrap backend private key (which corresponds to the rewrap backend public key). The rewrap backend 150 then reencrypts the transaction key with the KEK. In some implementations, the KEK of the rewrap backend 150 can be referred to as the rewrap KEK and the KEK of the DTSP 140 can be referred to as the DTSP KEK. In some implementations, the rewrap KEK and the DTSP KEK are symmetric keys that are essentially identical in functionality. The reencrypted transaction key can be referred to as the rewrapped transaction key. Reencrypting can be referred to as rewrapping.

The rewrap backend 150 then generates rewrapped encrypted transaction data 192 which includes the rewrapped transaction key and the encrypted transaction data. In some implementations, the rewrap backend 150 can generate rewrapped encrypted transaction data 192 by encrypting both the transaction key and the encrypted transaction data (encrypted by the transaction key) with the KEK (as described herein). In this way, the rewrap backend decrypts various forms of encryption and then reencrypts the transaction data. The rewrap backend 150 can send the rewrapped encrypted transaction data 190 to the DTSP 140.

The DTSP 140 can decrypt the rewrapped encrypted transaction data 190 using the KEK and then process the data transfer. In some examples, the data transfer service provider can work with data transfer processors 160 by sending the transaction data to the data transfer processors 160 for processing. An example data transfer processor can be a payment network operator. Another example data transfer processor can be an issuer of the instrument used for the data transfer. In some examples, the DTSP can send the transaction data to the payment network operator who can send the transaction data to the issuer. For example, an instrument can be a credit card and the issuer can be a bank. Once the data transfer has been processed or authorized, the data transfer service provider 140 can send an authorization response 192 to the source application 112. This can indicate that the second data was verified and authorized, the transaction was authorized, and the transaction was completed.

In some cases, the source application 112 is a source-facing application that can be responsible for initializing a data transfer. An example source application is a merchant app which can be responsible for initializing a sale or payment. The source application can be used to generate first data 180. In some implementations, the first data 180 can include data regarding the cost of the transaction, a description of goods or services, description of the time and place of the transaction, and the like. Through the use of the SDK 114, the source application 112 can communicate with the reader 120 and initialize a virtual terminal 126. For example, when the user starts a transaction, the source application 112 can contact the reader 120 through the SDK 114. In the initialization of the virtual terminal 126, the reader 120 initializes a particular virtual terminal 126 that is associated with the source application 112 and the DTSP 140. As such a different virtual terminal 126 will need to be initialized in order to communicate with a different pair of a source application 112 and a DTSP 140.

In some examples, the source may be ready to start a transaction (for example, receive data transfers), so a user may press "start transaction." Some transactions may be related to payments such that a user (for example, a customer) can enter some value (for example, $10), and press "pay." In response to this, the system can contact the software development kit (SDK) 114, and call a function (for example, "transact"). In some examples, the SDK 114 is the implementation of the APIs noted above with respect to the frontend integration. Then, the SDK 114 can pass the first data to the reader 120.

Prior to the transaction, the reader 120 can be initialized and configured. The reader 120 can be specific to a particular pairing of source application 112 and DTSP 140. The reader 120 can then initiate an instrument reader. The instrument reader can be an application (for example, corresponding to a second application, where the source application is the first application) and can then take control of the user interface (UI) of the device 110, presenting an instrument reader UI. In some examples, the instrument reader UI can be presented on top of the source application UI, the instrument reader UI may display information to the user, that identifies the requested data value (for example, $10), the name of the source, and how/where to place their instrument (for example, where to tap the instrument of the user). In some implementations, the instrument reader is a card reader. In some cases, the source logo or a default logo (for example, based on Merchant Category Code (MCC)) can be displayed.

In some implementations, the instrument can be a payment instrument or card (for example, a credit card, digital wallet application containing digital payment information, etc.). In some implementations, the instrument can be read by an instrument reader and the second data 182 is sent to the secure element 124 for processing. In some implementations, the reader 120 never receives the second data 182. In some implementations, the reader 120 never receives the second data 182 in an unencrypted form.

The secure element 124 can receive both the first data 180 and the second data 182. The secure element 124 can be designed for data security and ensures the security and integrity of the transaction data as described herein. The secure element 124 can host the virtual terminal 126. The virtual terminal 126 can generate transaction data from the first data 180 and the second data 182. The virtual terminal 126 can apply several layers of security and encryption as described herein. The virtual terminal 126 can encrypt the transaction data with a key that is only known by the secure element 124, known as a transaction key. The transaction key can be randomly generated by the virtual terminal 126 at the time of the transaction. Then the secure element 124 can use a rewrap backend public key to encrypt the transaction key. The virtual terminal 126 receives/generates the rewrap backend public key during initialization of the virtual terminal 126. The rewrap backend public key corresponds to a rewrap backend private key which is held by the terminal backend 130 and/or the rewrap backend 150. In some implementations, the rewrap backend public key is used to encrypt additional metadata. The encrypted transaction data (encrypted by the transaction key), the encrypted transaction key (encrypted by the rewrap backend public key) and the additional metadata are used to generate the encrypted transaction blob 184. The metadata can include various security and encryption information in addition to transaction data and can also be encrypted. The metadata can also include other data such as the description of the time and place of the transaction, the description and time of the encryption, and the like.

After the secure element 124 has generated the encrypted transaction blob 184, the encrypted transaction blob 184 (sometimes referred to as an encrypted blob) can be sent to the reader 120. The reader 120 can then add additional metadata and further encryption to generate the encrypted reader blob 186. The metadata can be used to verify the transaction. In some implementations, the metadata is encrypted by a transport server key while the encrypted transaction blob 184 may not be further encrypted. The transport server key can be generated during initialization of the reader 120 and corresponds to a transport server key which is held by the terminal backend 130 and/or the rewrap backend 150. The reader 120 can send the encrypted reader blob 186 to the source application 112, and the instrument reader application UI can close, leaving the source application running (and displayed on the UI), and the source application now has the encrypted reader blob 186. In some examples, the instrument reader application UI is closed once authorization for the transaction is received by the source application 112.

Because the encrypted transaction blob 184 was encrypted with a transaction key that is only known by the virtual terminal 126, the source application 112 and DTSP 140 may not be able to decrypt the transaction data. Further description of the encryption done by the virtual terminal 126 of the secure element 124 on the transaction data is described herein.

There are two system backends which work with the virtual terminal to encrypt and decrypt the transaction data. The system backends can provide security for data according to security standards (for example, the PCI CPoC Standard (collectively, the CPoC Validations)). The first backend can be referred to as the terminal backend 130 or the Contactless Payment on (Customer off-the-shelf Device (COTS)) (CPOC) (which can also be referred to as Mobile Payment on COD (MPOC) backend). The terminal backend 130 can also referred to herein as the instrument reader backend. In some implementations, the terminal backend 130 is configured to initialize the virtual terminal 126 before the data transfer (for example, of an instrument or other data transfer instrument). As part of the initialization, the terminal backend 126 can validate and/or perform many necessary initialization processes. These initialization processes can include verifying the virtual terminal token, generating the session token, sending the virtual terminal configuration to the secure element, running attestation checks, etc. as described herein.

The second backend can be referred to as the rewrap backend 150, the instrument data processor backend, or the data transfer rewrap backend. The rewrap backend 150, as described herein, handles the rewrap process which decrypts the encrypted reader blob 186 using a transport server key to examine the metadata within. Using the metadata, the rewrap backend 150 is able to verify that the data transfer has been authorized by the DTSP 140, the source application 112, and/or the terminal backend 130. In addition to the metadata, the encrypted reader blob 186 also includes the encrypted transaction blob 184 which has the encrypted transaction key (encrypted by the rewrap backend public key) and the encrypted transaction data (encrypted by the transaction key). The rewrap backend 150 can decrypt the encrypted transaction key (encrypted by the rewrap backend public key) using a corresponding rewrap backend private key once the metadata has been verified. The rewrap backend 150 then reencrypts the transaction key using a KEK to generate a reencrypted transaction key. The reencrypted transaction key and the transport-key encrypted transaction data can be referred to as the rewrapped encrypted transaction data 190 that can be decrypted by the DTSP 140. Referring back to the virtual terminal 126 and related terminal backend 130, the terminal backend 130 works with the virtual terminal 126 to securely encrypt the transaction data in the secure element 124.

After receiving the encrypted reader blob 186 from the reader 120, the source application 112 can send the encrypted reader blob 186 with an authorization request 188 to the DTSP 140 in order to determine if the transaction is authorized. In some examples, the DTSP 140 may be the same entity, or controlled by the same entity, which created the source application 12; however, it could be a completely different entity. For example, a source may make an account on a source application 112, such that the source may not own the source application but uses the source application to facilitate data transfer and other data transfer concerns. The source application 112 may then be operated by the same or a different entity as the DTSP 140.

In some implementations, the DTSP 140 is unable to decrypt the encrypted reader blob 186 upon receipt from the source application 112 because the decryption keys (the transport server key and the rewrap backend private key) for the encrypted reader blob 186 may not be known to the DTSP 140. This is part of the security of the encryption for the transaction data. Similarly, the source application 112 may not have the keys to decrypt the encrypted reader blob 186. These features help ensure the security of the encrypted reader blob 186. However, the DTSP 140 can send the encrypted reader blob 186 to the rewrap backend 150 for decryption.

In some examples, the DTSP could be a payment service provider ("PSP") such as a bank (or, alternatively, a bank affiliate) or a corporate entity, such as an acquirer processor or a payment facilitator or aggregator, which is unlicensed or licensed as a non-bank financial institution (such as a money transmitter). Additionally, the transaction information can be transmitted as follows. (1) from a user through his or her payment device to the secure element in the source's (for example, merchant's) mobile device, (2) from the secure element to the card reader application; (3) from the card reader application to the source application via the frontend integration; (4) from the source application to the DTSP's payment system; (5) from the DTSP's payment system to the backend platform via the backend integration; (6) from the backend platform to the DTSP's payment system via the backend integration; (7) (a) if the DTSP is not an acquirer processor (for example, a payment facilitator or payment aggregator), from the DTSP to the acquirer processor to the payment network or (b) if the DTSP is an acquirer processor, from the DTSP directly to the payment network; (8) from the payment network to the issuing bank or issuer processor for authorization; and/or (9) with the authorization results sent back through the DTSP's system directly to the source application. In some implementations, neither the application/device provider nor the backend platform will see any of the consumer's sensitive payment information.

The rewrap backend 150 has access to the proper keys (the transport server key and the rewrap backend private key) to decrypt the encrypted reader blob 186. In some implementations, the rewrap backend 150 can use corresponding private keys (to the public keys used to encrypt the encrypted reader blob 186 and encrypted transaction blob 184) to decrypt the encrypted reader blob 186 and the encrypted transaction blob 184. The rewrap backend 150 can decrypt the encrypted transaction key (encrypted by the rewrap backend public key) and reencrypt the decrypted transaction key with a backend KEK that the DTSP knows. The rewrap backend 150 can provide the rewrapped encrypted transaction data 190 back to the DTSP. In some implementations, rewrapping can mean that the "transaction key" can be unwrapped by decrypting the transaction key via the rewrap backend private key (corresponding to the rewrap backend public key used to encrypt the transaction key) and rewrapped using a backend KEK. The DTSP is able to use a DTSP KEK (which corresponds to the backend KEK) to unwrap the transaction key. The DTSP is then able to use the transaction key to decrypt the transaction data. Once this process is complete, the DTSP can have the transaction data for the data transfer and can process the data transfer with a data transfer processor.

Once the rewrap backend 150 has decrypted the encrypted reader blob 186 certain verifications of the metadata in the encrypted reader blob 186 can be performed. If the verifications are validated, the rewrap backend 150 can then decrypt the encrypted transaction key of the encrypted transaction blob 184 using the rewrap backend private key. The rewrap backend 150 can rewrap the transaction key using a backend KEK (which corresponds to a DTSP KEK), generating rewrapped encrypted transaction data 190 from the encrypted transaction data and the rewrapped transaction key. In this way, the DTSP 140, which has access to their particular DTSP KEK (which corresponds to the rewrap KEK), can decrypt the rewrapped transaction key of the rewrapped encrypted transaction data 190. The rewrapped transaction key can then be used to decrypt the encrypted transaction data. The rewrapped encrypted transaction data 190 can also be referred to as the rewrapped transaction data or rewrapped transaction blob. This step of re-encrypting the transaction data on the rewrap backend 150 such that the transaction data is encrypted for the DTSP 140 to decrypt can be referred to as rewrapping. The rewrap backend 150 can include a hardware security module (HSM). Some or all of the encryption and decryption done on the rewrap backend 150 can be done in the HSM. Further description of the rewrap backend 150 and the processes performed by the rewrap process as described herein.

In some implementations, if the verifications are validated, the rewrap backend 150 can then decrypt the encrypted transaction key of the encrypted transaction blob 184 using the rewrap backend private key. In some implementations, the encrypted transaction data can be decrypted using the transaction key to verify/validate the transaction data. In some implementations, if the transaction data has been verified and/or validated, the rewrap backend 150 can encrypt the transaction key using a backend KEK (which corresponds to a DTSP KEK) and reencrypt the transaction data using the transaction key, generating rewrapped encrypted transaction data 190.

The DTSP 140 is then able to decrypt the rewrapped encrypted transaction data 190 upon receipt. In some implementations, some or all decryption of the rewrapped encrypted transaction data 190 happens on a DTSP-controlled HSM (DTSP HSM). The DTSP 140 can then process the transaction data. For example, the DTSP 140 can determine if the second data 182 is payment information and whether there are sufficient funds associated with the second data 182. The DTSP 140 can also send the transaction data to another party for processing, such as the data transfer processor 160. Once the DTSP 140 (or the data transfer processor 160) has processed the transaction data, the DTSP 140 is able to send an authorization response 182 to the source application 112. The authorization response 192 can indicate whether authorization is granted or denied for the transaction.

Once complete, a message that indicates whether the data transfer was approved or not can be sent back to the source application. Additionally other information pertaining to the source's day-to-day business operations (for example, user authorizations and transaction histories) can be sent directly between the DTSP and the source application.

Figure 2:
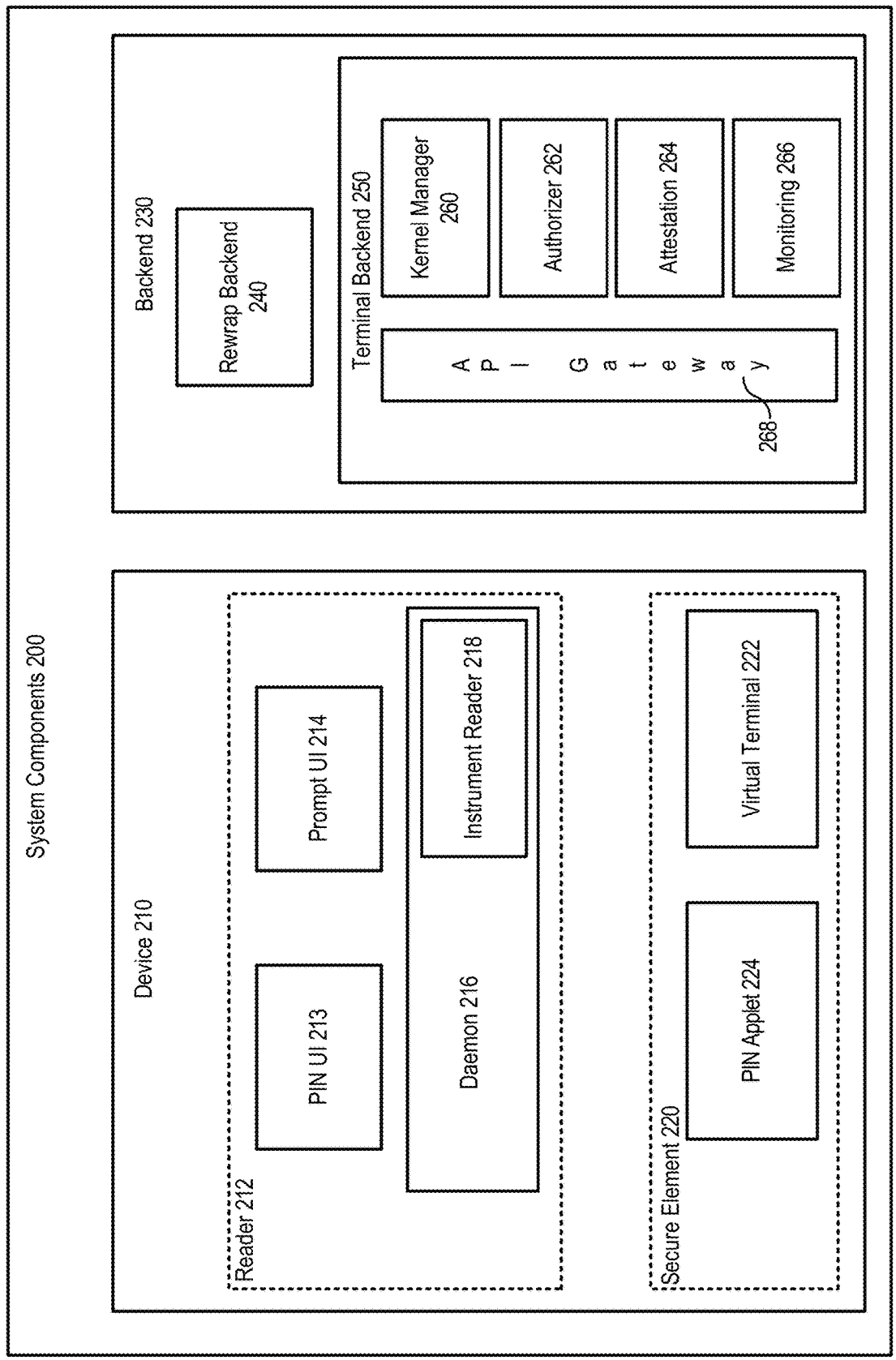
FIG. 2 illustrates a block diagram for illustrating the techniques described herein, according to an embodiment of the present disclosure.

FIG. 2 illustrates example system components 200. The system components can include components on the device 210 and components of the backend 230. The device 210 includes the reader 212 and the secure element 220. The reader 212 is hosted on the typical hardware of the device. For example, the reader 212 has access to the typical processor used for most or all applications also known as an application processor. Likewise, the reader 212 uses memory (for example, random access memory, short term memory, or volatile memory) and storage (for example, a solid-state drive or other long term storage or non-volatile storage) of the device 210. There is also a secure element 220 which hosts the virtual terminal 222 and the PIN applet 224. The backend 230 is representative of server devices or external devices to the multipurpose device. The device 210, the reader 212, the secure element 220, the virtual terminal 222, the rewrap backend 240, and the terminal backend 250 are equivalent to the device 110, the reader 120, the secure element 124, the virtual terminal 126, the rewrap backend 150, and the terminal backend 130 of FIG. 1, respectively.

In some implementations, the reader 212 is implemented in software using part or all of a hardware component of the multipurpose device. The reader 212 can be run on the processor of the device 210 alongside other applications and processes. For example, the reader 212 can be run on the application processor of the device 210. The reader 212 can also include encryption services as described herein.

The reader 212 includes a PIN UI 213 and a prompt UI 214. The prompt UI 214 is used to indicate that the virtual terminal 222 is ready to receive the second data from a user. For example, the prompt UI 214 can be used to indicate that a user should present the second data. In some implementations, the prompt UI 214 can be used to indicate that a user should swipe, tap, or insert a card or use some kind of digital wallet on a mobile device. The prompt UI 214 can be used to indicate where on the multipurpose device a user should present their second data. For example, the prompt UI 214 may indicate to a user where to tap their card on the multipurpose device. The PIN UI 213 is used to indicate that the reader 212 is ready to receive the digits (for example, numbers, characters, symbols, etc.) of the PIN. For example, the PIN UI 213 can be used to indicate that a user should enter the PIN associated with the second data.

The reader 212 also includes a daemon 216 and an instrument reader 218. The daemon 216 can be used to run the processes and generate data associated with the device 210 that are not handled by the secure element 220. The daemon 216 can also be used to process the second data obtained by the instrument reader 218. Likewise, the daemon 216 can be used to process the PIN. The daemon can receive the digits of the PIN that a user enters after being prompted by the PIN UI 213. As described herein, the daemon 216 can encrypt each digit of the PIN using a PIN applet public key received from the PIN applet 224. The PIN applet 224 can have a corresponding PIN applet private key. The daemon 216 can store each digit of the PIN in the same memory location such that when the next digit of the PIN is received it writes over the last digit of the PIN. For example, when the second digit of the PIN is received, the second digit of the PIN will overwrite the memory location of the first digit of the PIN such that both the first digit and the second digit of the PIN are not in memory at the same time. The instrument reader 218 is used to read the second data from the user and process the second data.

The device 210 also includes a secure element 220. The secure element 220 is an element designed for security on the multipurpose device. In some implementations, the secure element 220 is a separate chip or hardware module from a processor of the device. For example, the secure element 220 can be operating on a separate chip from the processor running the reader 212. In some implementations, the secure element 220 is a software module that includes additional software security features for running processes, whereas the reader 212 may not use those additional software security features. In some implementations, the secure element 220 is specifically used only by the device 210 and only runs processes associated with the device 210. In some implementations, the secure element 220 runs some processes associated with the device 210, and also runs processes for other applications on the multipurpose device that need additional security features.

The secure element 220 houses the virtual terminal 222 and the PIN applet 224. The secure element 220 can house multiple virtual terminals 222 which correspond to different pairs of source applications and DTSPs. The virtual terminal 222 has a virtual terminal kernel (also referred to as a terminal kernel) that is configurable by a kernel token. The virtual terminal 222 is designed to encrypt data. For example, the virtual terminal 222 encrypts transaction data generated from the second data and the first data. The virtual terminal 222 can employ many types of keys, hashes, and other cryptography when encrypting data. Examples of encryption done by the virtual terminal 222 are contained herein. The PIN applet 224 is the application that receives the digits of the PIN from the reader 212. When the PIN request process begins, the PIN applet 224 can receive a PIN initiation signal from the reader 212. The PIN applet 224 can generate a PIN applet public key and a corresponding PIN applet private key. In some examples, the PIN applet public key and the corresponding PIN applet private key can be randomly generated for each entry of the PIN. For example, the PIN applet public key and the corresponding PIN applet private key can change for each entry of a PIN on the device 210. The PIN applet 224 can send the PIN applet public key to the daemon 216 of the reader 212. The daemon 216 can encrypt digits of the PIN using the PIN applet public key. The PIN applet 224 can decrypt the digits of the PIN using the PIN applet private key. The PIN applet 224 can also generate the PIN block as described herein.

The backend 230 represents system components that may not be stored on the device 210. In some implementations, the backend 230 is representative of one or more devices, typically with server functionality. The backend 230 can include a rewrap backend 240 and a terminal backend 250. The terminal backend can include an API gateway 268, a kernel manager 260, an authorizer 262, an attestation subsystem 264, and a monitoring subsystem 266.

The rewrap backend 240 receives the encrypted transaction data (for example, the encrypted reader blob 186 of FIG. 1) from the DTSP, decrypts some or all the encrypted transaction data (for example, metadata of the encrypted reader blob 186 of FIG. 1 and the encrypted transaction key), verifies some or all of the transaction data (for example, the metadata of the encrypted reader blob 186 of FIG. 1), and then re-encrypts some or all the transaction data (for example, the transaction key after being decrypted using the rewrap backend private key) with a KEK associated with the DTSP. The rewrap backend 240 and the processes performed by the rewrap backend 240 are further described herein.

The API gateway 268 is used to mediate the interaction between the device 210 and the terminal backend 250. For example, the API gateway 268 mediates the communications, interactions, and transmission between the device 210 and the kernel manager 260, authorizer 262, attestation subsystem 264, and the monitoring subsystem 266.

The kernel manager 260 can be used to create and generate kernel tokens. The kernel manager 260 can also be used to generate scripts for the configuration of virtual terminals 222 in the secure element 220 of the device 210.

The authorizer 262 can be used to authorize DTSPs, sources, and devices to use the virtual terminal system. This ensures that only DTSPs, sources, and devices that have been accepted to use the virtual terminal system can use the techniques described herein. Authorization can include the use of tokens, keys, accounts, credentials, and the like.

The attestation subsystem 264 can be used to authorize and verify devices (for example, mobile devices and servers) using the virtual terminal system. The attestation subsystem 264 is part of security systems designed to prevent hacking or improper use of the virtual terminal system to create false transactions or hijack existing transactions. Hijacking transactions can include altering any transaction data related to a transaction such that the transaction data may not accurately match or correspond to the transaction.

The monitoring subsystem 266 can be used to monitor transactions and devices (for example, the virtual terminal 222 and the reader 212) using the virtual terminal system described herein. Monitoring transactions can be critical for compliance with CPOC and other regulations involving wire transfers, transactions, etc. and related devices.

Figure 3:
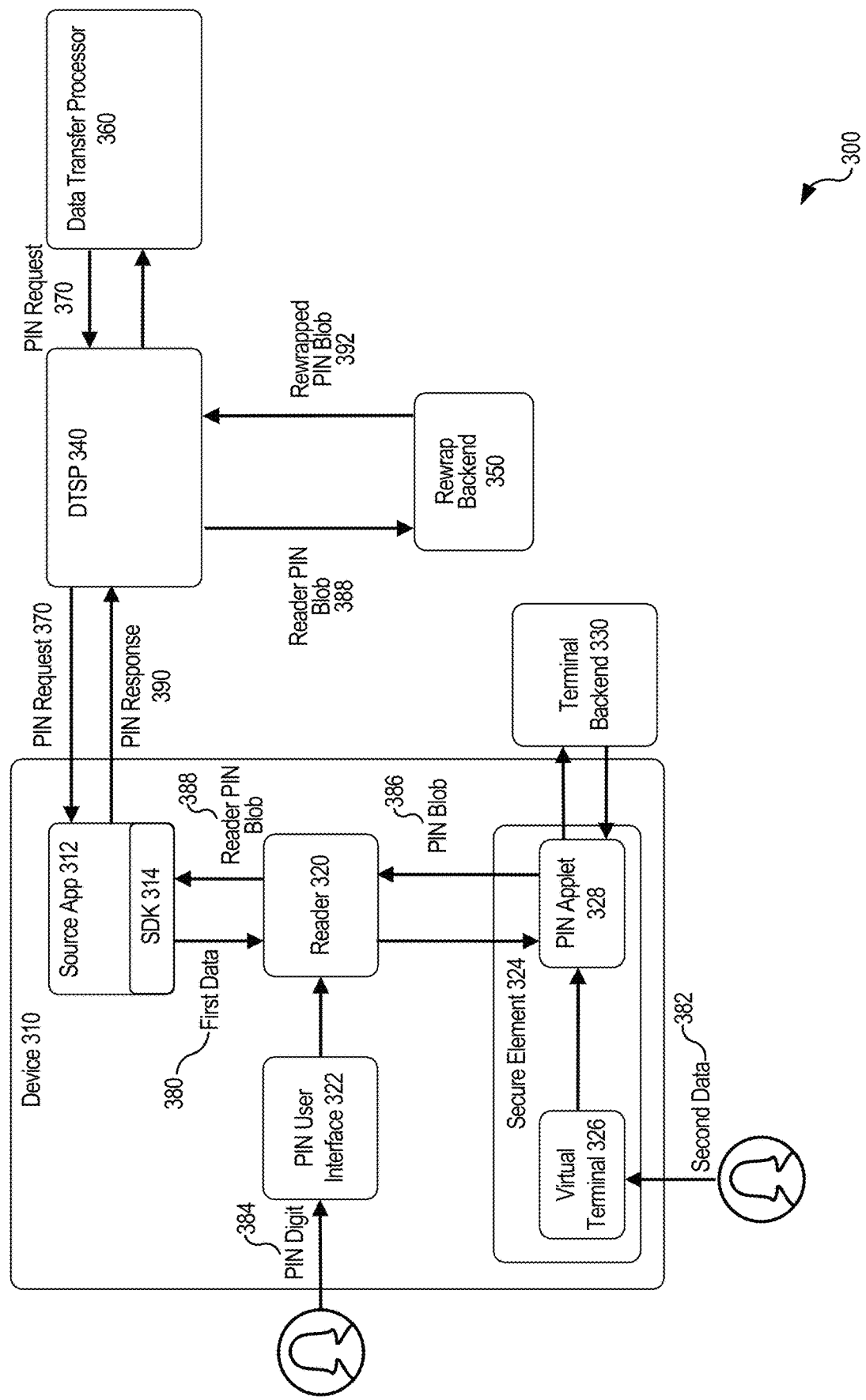
FIG. 3 illustrates a block diagram for illustrating the techniques described herein, according to an embodiment of the present disclosure.

FIG. 3 illustrates an example block diagram 300 with example systems and components for implementing the virtual terminal techniques described herein. The device 310 (for example, the device 110 of FIG. 1) includes a source application 312 (for example, the source application 112 of FIG. 1) which interacts with an SDK 314 (for example, the SDK 114 of FIG. 1) in order to send first data 380 to the reader 320 (for example, the reader 120 of FIG. 1). In some examples, the first data 380 is the same as the first data 182 of FIG. 1. In some examples, the first data 380 is different than the first data 182 of FIG. 1. The first data 380 can include transaction information and/or data transfer information. The virtual terminal 326 (for example, the virtual terminal 126 of FIG. 1) is hosted within a secure element 324 (for example, the secure element 124 of FIG. 1). The secure element 324 receives the second data 382 which can detail how the data transfer can be provided to the source associated with the source application 312. The second data 382 can include instrument information. In some examples, the second data 382 is the same as the second data 182 in FIG. 1. In some examples, the second data 382 is different than the second data 182 in FIG. 1.

Generating a PIN response 390 and reader PIN blob 388 can be referred to as PIN capture. In some examples, the device 310 can generate a PIN response 390 and reader PIN blob 388 in response to a PIN request 370 from a data transfer processor 360 (DTP) forwarded by the DTSP 340 to the source application 312. For example, the DTSP 340 may be processing a data transfer as shown in FIG. 1 and the data transfer processor 360 (for example, an issuer of an instrument such as a debit card) requests a PIN. With reference to FIG. 1, when the DTSP 140 decrypts the rewrapped encrypted transaction data 190, the DTSP 140 can determine that a PIN is required prior to sending the authorization response 192. Alternatively, the DTP 160 can receive the transaction data and determine a PIN is required before the DTP 160 can send confirmation of the transaction to the DTSP 140. Once the DTSP 140 receives the confirmation of the transaction from the DTP 160, the DTSP can send the authorization response 192. Returning to FIG. 3, the DTSP 340 can forward the PIN request 370, received from the data transfer processor 360, to the source application 312. Once the DTP 360 has received the PIN from the DTSP 340 and verified the PIN, the DTP 360 can send confirmation of the transaction to the DTSP 140, and the DTSP 140 can send the authorization response 192 as shown and described with reference to FIG. 1. In some examples, the device 310 can generate a PIN response 390 after determining that the instrument (for example, the card) providing the second data 382 (for example, the card number) is associated with a PIN. As such, the device can generate a PIN response 390 and reader PIN blob 388 without receiving a PIN request 370 from the DTP 360 and/or the DTSP 340. For example, the instrument may send information to the virtual terminal 326 or the reader 320 that indicates a PIN is required for the data transfer.

When PIN capture is initiated as described above, the reader 320 can cause the device 310 to display a PIN user interface 322 (for example, the PIN UI 213 of FIG. 2). A user can enter one PIN digit 384 of the PIN at a time. The PIN digit 384 can be sent to the reader 320. The reader 320 can store and encrypt the PIN digit 384 as described herein. The reader 320 can send the encrypted PIN digit to the PIN applet 328 (for example, the PIN applet 224 of FIG. 2). A process for capturing individual PIN digits is described with reference to FIG. 5.

The virtual terminal 326 can send the second data 382 to the PIN applet 328. The secure element 324 (and the PIN applet 328) can also communicate with a terminal backend 330 (for example, the terminal backend 130 of FIG. 1) for various security and encryption features described herein in order to encrypt the PIN block. In some implementations, the secure element 324 communicates with the terminal backend 330 via the reader 320 wherein the communications are encrypted. The techniques for encrypting the PIN block described herein allow the PIN stored in the secure element 324 to be stored in a plain format (for example, an unencrypted format) such that no proprietary format is used to encrypt the PIN. This can enable the DTSP 340 and DTP 360 to receive the PIN in a plain format once all decryption has been completed. The PIN applet 328 can encrypt the PIN using a transaction key only known by the PIN applet 328, virtual terminal 326, and/or the secure element 324. The transaction key is then encrypted by a rewrap backend public key (which corresponds to a rewrap backend private key held by the terminal backend 330 and/or the rewrap backend 350) as described herein. In some examples, the rewrap backend public key used here is the same rewrap backend public key with reference to FIG. 1. In some examples, the rewrap backend public key used here is different than the rewrap backend public key with reference to FIG. 1. The use of a rewrap backend public key and rewrap backend private key can enable asymmetric cryptography to be used in the secure element 324, rewrap backend 350, and DTSP 340. Asymmetric cryptography can reduce the risk of a key being leaked and used by third-parties to decrypt transaction data as compared to a symmetric cryptography systems. Thus, PIN applet 328 has a transaction key encrypted by a rewrap backend public key and PIN block encrypted by at least the transaction key. The PIN applet 328 can generate a PIN blob 386 from the encrypted transaction key and the PIN block. The PIN blob 386 can also include additional metadata as described herein. The use of the PIN blob 386 can prevent the PIN and related metadata from being exposed outside the secure element 324 before the DTSP 340 and/or DTP 360 can process the PIN and related metadata. This process is further explained in relation to FIG. 6.

The virtual terminal 326 then sends the PIN blob 386 to the reader 320. In some examples, the reader 320 can send the PIN blob 386 to the source application 312. In some examples, the reader 320 can add additional metadata about the data transfer associated with the PIN blob 386. The additional metadata can be encrypted using a transport server key as described herein. The combination of the additional data encrypted using the transport server key and the PIN blob 386 can be referred to as the reader PIN blob 388. In some implementations, the PIN blob 386 can also be encrypted by the transport server key. The use of the additional metadata in the reader PIN blob 388 can allow the rewrap backend 350 to verify the encrypted metadata to validate the PIN block without decrypting the PIN block itself. In some implementations, the combination of the reader 320, the secure element 324, and the virtual terminal 326 can be referred to as a virtual terminal system.

In some examples, the PIN blob 386 and/or the reader PIN blob 388 can be included with the encrypted transaction blob 184 of FIG. 1 (and the related metadata) when generating the encrypted reader blob 186. The PIN blob 386 can be included in the encrypted reader blob 186 when the device 310 generates a PIN response 390 without a PIN request 370 from the DTSP 340 and/or DTP 360 as described above.

The source application 312 can send the reader PIN blob 388 with a PIN response 390 to the data transfer service provider (DTSP) 340. In some examples, the PIN response 390 is in response to the PIN request 370. In some examples, the PIN response 390 is generated based on the instrument providing the second data 382 indicating that a PIN is required for the transaction. As such the PIN response 390 can be generated without a PIN request 370 being sent by the DTSP 340. The DTSP 340 may not be able to decrypt some or all of the reader PIN blob 388 and sends the reader PIN blob 388 to the rewrap backend 350 for decryption.

In some examples, reader PIN blob 388 can include the encrypted metadata from the reader 320. In these examples, the rewrap backend 350 can decrypt the encrypted metadata of reader PIN blob 388 using a transport server key (which corresponds to the transport server key) and verify various portions of the metadata in order to verify that the PIN block has been authorized by the DTSP 340, the source application 312, and/or the terminal backend 330 as described herein. This allows the rewrap backend 350 to verify the transaction and/or data transfer corresponding to the PIN block without seeing the underlying unencrypted PIN and transaction data. This can ensure the privacy of the underlying PIN and transaction data as the source application 312 and rewrap backend 350 never decrypt the PIN encrypted by the transaction key. In some implementations, the rewrap backend 350 can also decrypt the reader PIN blob 388 to verify and validate various portions of additional metadata and transaction data of the PIN blob 386.

The rewrap backend 350 can reencrypt the transaction key with a KEK, a symmetric key known by the DTSP such that the DTSP can decrypt the transaction key (using the KEK) and in turn decrypt the PIN block (using the transaction key). However, the transaction key is currently encrypted by the rewrap backend public key. The rewrap backend 350 can decrypt the transaction key using the rewrap backend private key (which corresponds to the rewrap backend public key). The rewrap backend 350 then reencrypts the transaction key with the KEK. In some examples, the KEK of the rewrap backend 350 can be referred to as the rewrap KEK and the KEK of the DTSP 340 can be referred to as the DTSP KEK. In some implementations, the rewrap KEK and the DTSP KEK are symmetric keys that are essentially identical in functionality. The reencrypted transaction key can be referred to as the rewrapped transaction key. In some examples, the KEK and rewrap KEK here can be the same KEK and rewrap KEK referenced with respect to FIG. 1. In some examples, the KEK and rewrap KEK here can be a different than the KEK and rewrap KEK referenced with respect to FIG. 1.

The rewrap backend 350 then generates the rewrapped PIN blob 392 which includes the rewrapped transaction key and the PIN block. In some implementations, the rewrap backend 350 can generate the rewrapped PIN blob 392 by encrypting both the transaction key and the PIN block (encrypted by the transaction key) with the KEK (as described herein). In this way, the rewrap backend decrypts various forms of encryption and then reencrypts the PIN block. The rewrap backend 350 can send the rewrapped PIN blob 392 to the DTSP 340. The DTSP 340 can decrypt the rewrapped transaction key using the KEK.

The DTSP 340 may need to send the PIN block and transaction key to the DTP 360 to receive confirmation of the transaction. With reference to FIG. 1, the DTSP 140 can send an authorization response 192 to authorize the data transfer associated with the PIN once the DTSP 340 receives confirmation of the transaction from the DTP 360. The DTSP 340 can also rewrap the transaction key with a DTP KEK, a KEK shared between the DTP 360 and the DTSP 340. The rewrapping of the transaction key with the DTP KEK can occur within the DTSP HSM. The DTP 360 can also have a DTP HSM for secure cryptography and data transfers. The DTSP 340 can send the transaction key (encrypted with the DTP KEK) and the PIN block to the DTP 360. The DTP 360 can decrypt the transaction key with the DTP KEK and decrypt the PIN block with the transaction key. The DTP 360 can verify the PIN and send confirmation of the transaction to the DTSP 340. With reference to FIG. 1, the DTSP 140 can send an authorization response 192 to authorize the data transfer associated with the PIN.

Figure 4:
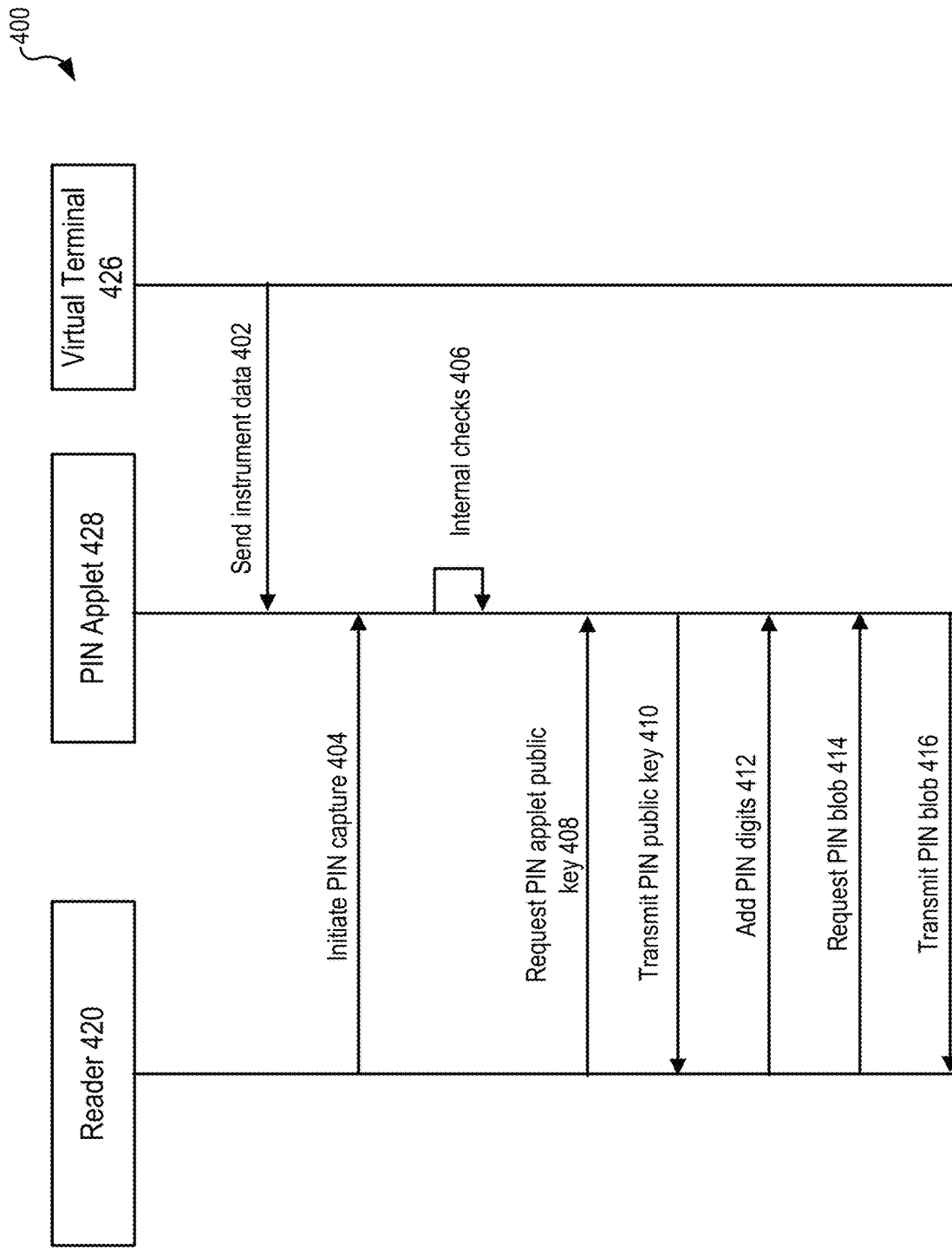
FIG. 4 illustrates a sequence diagram for performing the techniques described herein, according to an embodiment of the present disclosure.

FIG. 4 illustrates a sequence diagram 400 of an example high-level sequence for implementing the virtual terminal techniques described herein. The example sequence includes generating the PIN blob (for example, the PIN blob 386 of FIG. 3) on the virtual terminal 426, the reader 420, and the PIN applet 428. The example sequence can also be referred to as the PIN capture. The virtual terminal 426, the reader 420, and the PIN applet 428 correspond to the virtual terminal 326, the reader 320, and the PIN applet 328 of FIG. 3, respectively. As described herein, the virtual terminal 426 and the PIN applet 428 are hosted by a secure element (for example, the secure element 324 of FIG. 3).

Prior to the beginning of the example sequence diagram 400, the DTSP (for example, the DTSP 340 of FIG. 3) can send a PIN request (for example, the PIN request 370 of FIG. 3) to the source application (for example the source application 312 of FIG. 3) that originates from a DTP (for example, the DTP 360 of FIG. 3). In some examples, the data transfer process as described in relation to FIG. 1 has initiated a data transfer and a PIN is required as described in relation to FIG. 3. The requirement of the PIN can lead to the sequence of the example sequence diagram 400. In some examples, the instrument (for example, a credit card or debit card) being used for the data transfer can indicate to the virtual terminal 426 that a PIN is required to complete the data transfer. The instrument indicating that a PIN is required can lead to the sequence of the example sequence diagram 400. For example, the virtual terminal 426 can send an indication to the reader 420 that a PIN needs to be captured.

At block 402, the virtual terminal 426 can send the instrument data to the PIN applet 428. The instrument data relates to the instrument being used for the data transfer/transaction. The instrument data can include a variety of information including a primary account number ("PAN"). In some examples, the PAN is a card number such as a credit card number or debit card number. In some examples, the virtual terminal 426 can also include a transaction identifier ("transactionID"). For example, during the data transfer process as described in relation to FIG. 1, the data transfer can be associated with a transactionID. That same transactionID can be used to tie the data transfer to the PIN request.

At block 404, the reader 420 can initiate the PIN capture. The reader 420 can send a PIN capture initiation signal to the PIN applet 428 indicating that the PIN applet should initialize and perform internal checks prior to the receipt of the PIN digits. In some examples, the reader 420 can initiate the PIN capture after a PIN request from the DTSP to the source application and the source application forwards the PIN request to the reader 420 as described in relation to FIG. 3. In some examples, the virtual terminal 426 can send an indication to the reader 420 that the instrument being used for the data transfer has indicated that a PIN is required to complete the data transfer. The indication from the virtual terminal 426 can cause the reader 420 to initiate the PIN capture. The reader 420 can send a transactionID associated with the PIN capture when sending the PIN capture initiation signal to the PIN applet 428.

At block 406, the PIN applet 428 can run internal checks. The internal checks can include preparing a processor, memory, and storage associated with the secure element hosting the PIN applet 428 to receive the PIN digits. In some examples, the internal checks can include verifying that the PIN applet 428 has received instrument data (for example, a PAN) associated with the transactionID received from the reader 420. In some examples, if the PIN applet 428 has not received the instrument data associated with the transactionID, the PIN applet 428 can request the instrument data associated with the transaction ID from the virtual terminal 428 in preparation for receiving the PIN digits. In some examples, the internal checks can also include initialization steps such as generating a PIN applet public key and a PIN applet private key. In some examples, the PIN applet 428 can also send attestation information regarding the PIN applet 428 to the reader 420. In some examples, the PIN applet 428 can request attestation information from the reader 420 prior to sending the PIN public key to the reader 420. Attestation between the PIN applet 428 and the reader 420 can be used by both the PIN applet 428 and the reader 420 to verify that the other party is valid and authenticated.

At block 408, the reader 420 can request the PIN applet public key 408 from the PIN applet 428. In some examples, the PIN applet 428 can generate a new PIN applet public key and PIN applet private key pair for each PIN capture. In some examples, the PIN applet 428 can generate a new PIN applet public key and PIN applet private key pair in response to the request from the reader 420. Using a new PIN applet public key and PIN applet private key pair (also referred to as a random PIN applet public key and PIN applet private key pair) for every PIN capture can increase the security of PIN capture using the secure element of the device. In some examples, the PIN applet 428 can generate a new PIN applet public key and PIN applet private key pair during the internal checks 406. The PIN applet public key and the PIN applet private key may exclusively be used for receiving PIN digits from the reader 420. Any encryption scheme can be used. For example, elliptic curve integrated encryption scheme (ECIES) can be used.

At block 410, the PIN applet 428 can send the PIN public key to the reader 420. If the PIN applet 428 has performed the internal checks at block 406 and has the instrument data associated with the transactionID, the PIN applet 428 can send the PIN public key to the reader 420 and/or an indication that the PIN capture is authorized. When the reader 420 receives the PIN public key and/or the indication that the PIN capture is authorized, the reader 420 can cause the PIN UI to be displayed on the device for PIN capture. If the PIN applet 428 has performed the internal checks at block 406 and found that the PIN applet 428 does not have the instrument data for the transactionID within a period of time, the PIN applet 428 can send a PIN denial message. The reader 420 can receive the PIN denial message and may not display the PIN UI on the device. This mechanism can be used to ensure that a user does not enter a PIN into a device without a properly associated transactionID and proper instrument information that verify that an actual transaction is occurring. This can protect the user from disclosing the PIN unnecessarily.

At block 412, the reader 420 can send the PIN digits to the PIN applet 428. As described in further detail in relation to FIG. 5, each digit of the PIN can be encrypted and sent to the PIN applet 428 independently. Each PIN digit can be sent with the transactionID. As described in relation to FIG. 3, when the reader 420 receives the first PIN digit (for example, via the PIN UI), the reader 420 can store the first PIN digit in a first memory location of the device. The first PIN digit can be encrypted based on using the PIN public key. The first PIN digit can then be sent to the PIN applet 428. The encryption and sending of the first PIN digit all happens prior to the receipt of the second PIN digit. When the reader 420 receives the second PIN digit, the reader 420 can store the second PIN digit in the first memory location of the device writing over the first PIN digit such that the first PIN digit and the second PIN digit do not exist in unsecured memory (for example, the memory of the device as opposed to memory of the secure element) at the same time. The second PIN digit can be encrypted based on using the PIN public key and sent to the PIN applet 428. The process for each PIN digit repeats the above sequence. In some examples, a PIN can be four numbers. In some examples, a PIN can be any length of any combination of numbers, letters, symbols, and the like.

As the PIN applet 428 receives the encrypted PIN digits from the reader 420, the PIN applet 428 can decrypt the encrypted PIN digits using the PIN applet private key corresponding to the PIN applet public key. As such, the PIN will be fully decrypted inside the PIN applet 428 of the secure element. As described herein, the PIN is secure in the secure element because of the particular hardware and software implementation of the secure element.

At block 414, the reader 420 can request a PIN blob from the PIN applet 428. The request can include the transactionID. The request for the PIN blob can cause the PIN applet 428 to generate the PIN blob (for example, the PIN blob of 386 of FIG. 3). The PIN blob includes the PIN block, an encrypted transaction key, and additional metadata. The PIN applet 428 can generate a PIN block as described in relation to FIG. 6. The PIN block can be encrypted by the transaction key. The transaction key can be encrypted with the rewrap backend public key to generate the encrypted transaction key. Additional metadata can include the transactionID, version information regarding the PIN applet, and version information and operating system information regarding the secure element. In some examples, the reader 420 can send an indication to the PIN applet 428 that all PIN digits have been received prior to the request for the PIN block. In some examples, when the PIN applet 428 receives the indication from the reader 420, the PIN applet 428 can begin generating the PIN blob. At block 416, the PIN applet 428 can send the PIN blob to the reader 420.

Figure 5:
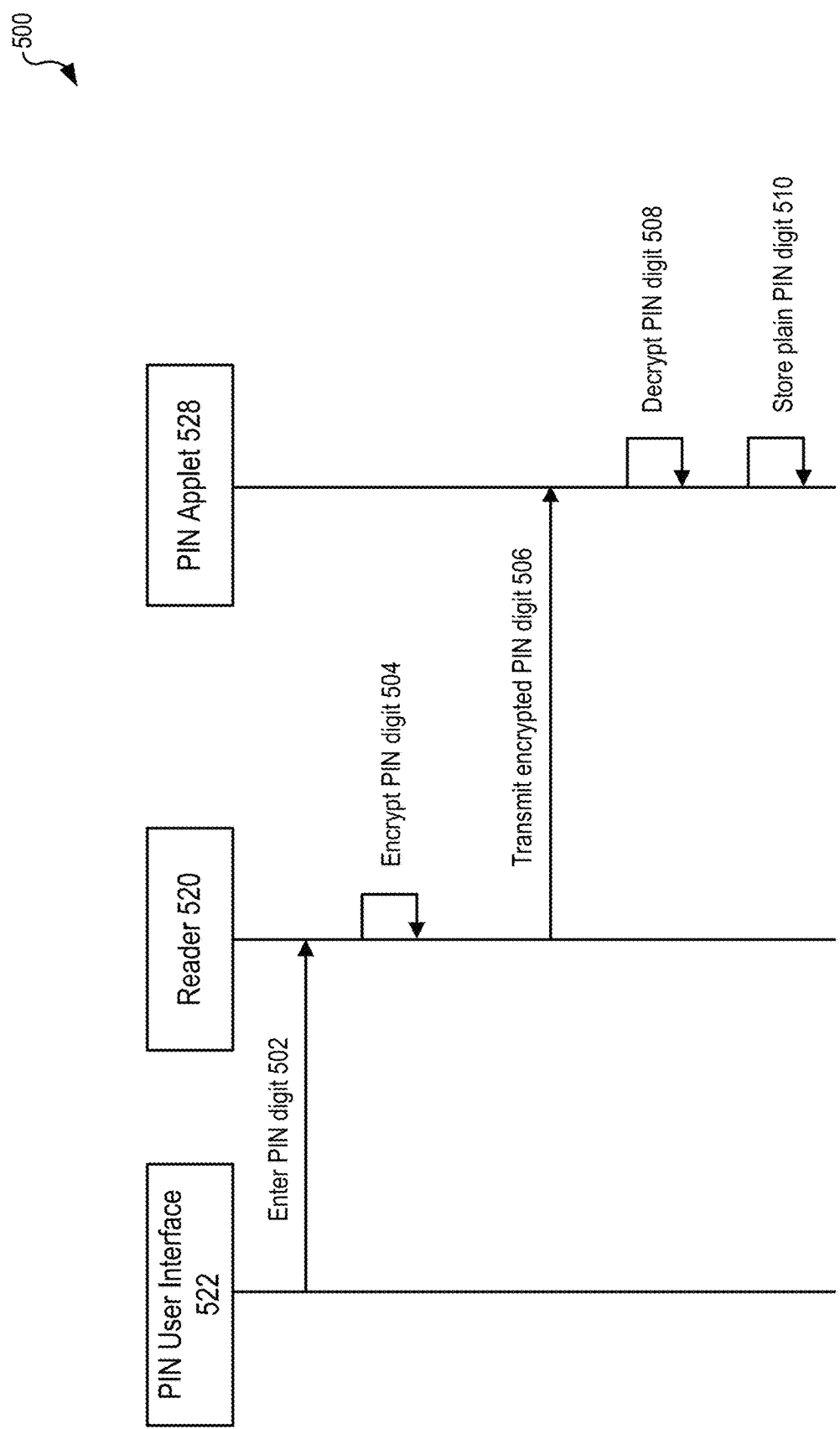
FIG. 5 illustrates a sequence diagram for performing the techniques described herein, according to an embodiment of the present disclosure.

FIG. 5 illustrates a sequence diagram 500 of an example high-level sequence for implementing the virtual terminal techniques described herein. The example sequence includes entering a PIN digit at the PIN user interface 522 and sending the PIN digit to the PIN applet 528. The virtual terminal 426, the reader 420, and the PIN applet 428 correspond to the virtual terminal 326, the reader 320, and the PIN applet 328 of FIG. 3, respectively. The PIN user interface 522, the reader 520, and the PIN applet 528 correspond to the PIN user interface 322, the reader 320, and the PIN applet 328 of FIG. 3, respectively. As described herein, the PIN applet 528 can be hosted by a secure element (for example, the secure element 324 of FIG. 3). The example sequence can be included in block 412 of FIG. 4. The example sequence can be repeated for each digit of the PIN. The example sequence can be referred to as PIN digit capture or individual PIN digit capture.

At block 502, a user can enter a PIN digit on the PIN user interface 522. The PIN user interface 522 can send the PIN digit to the reader 520. In some examples, the PIN user interface can be physical buttons or a software interface on a touch screen. The reader 520 can store the PIN digit in a first memory location on the device. The memory location for the PIN digit is considered unsecure because the memory of the device may not have the security features of the secure element. As each PIN digit is received by the reader 520, the reader 520 will write over the previous PIN digit by putting the newest PIN digit in the same first memory location. In this way, multiple PIN digits can be precluded from being stored in unsecure memory at the same time.

At block 504, the reader 520 can encrypt the PIN digit. The reader 520 can encrypt the PIN digit based at least on using the PIN applet public key received from the PIN applet 528 as described in relation to FIG. 4. At block 506, the reader 520 can send the encrypted PIN digit to the PIN applet 528. The encryption of the PIN digit and the sending of the PIN digit to the PIN applet 528 can be performed more quickly than a user can enter the next PIN digit.

At block 508, the PIN applet 528 can decrypt the PIN digit. The PIN applet 528 can decrypt the PIN digit based at least on using the PIN applet private key corresponding to the PIN applet public key as described in relation to FIG. 4. At block 510, the PIN applet 528 can store the plain, unencrypted PIN digit in the memory of the secure element. The memory of the secure element can be considered secure because of the specific hardware and software components of the secure element. As such, multiple PIN digits and/or the entire PIN can be stored in a plain, unencrypted state in the PIN applet 528. The entire PIN can be referred to as the PIN block.

Figure 6:
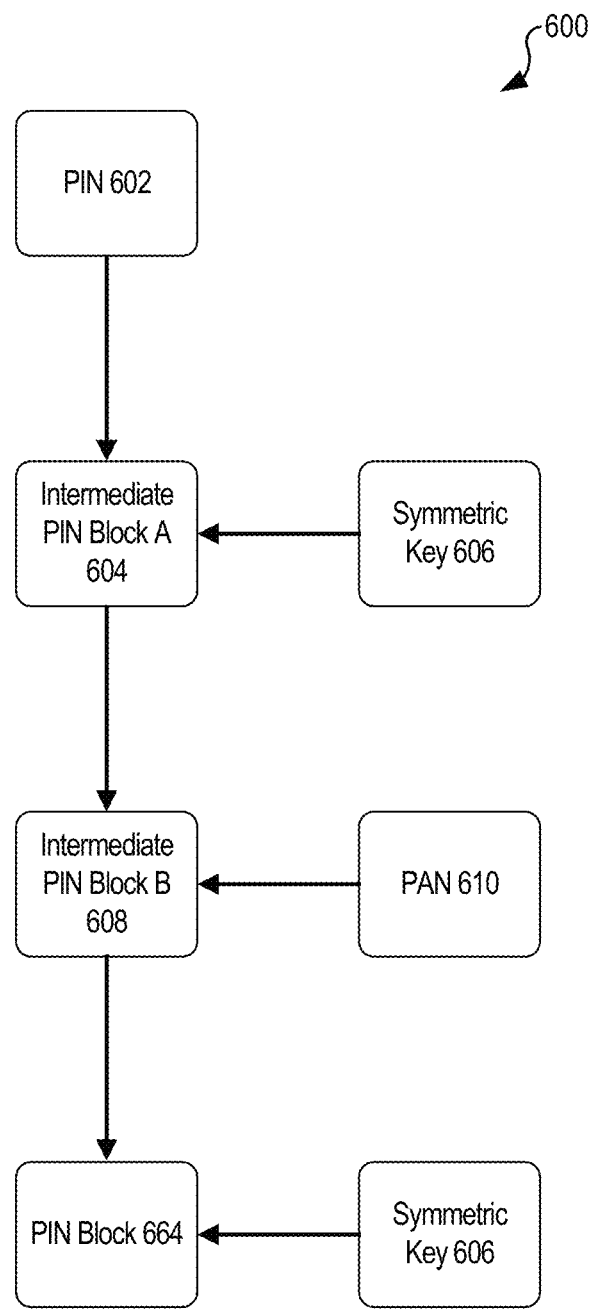
FIG. 6 illustrates a block diagram for performing the techniques described herein, according to an embodiment of the present disclosure.

In FIG. 6, an example diagram 600 for generating the PIN block 664 (for example, the PIN block of the PIN blob 386 of FIG. 3) is shown. The PIN applet (for example, the PIN applet 328 of FIG. 3) of the secure element (for example, the secure element 324 of FIG. 3) can generate the PIN block 664. Generating the PIN block 664 can be in response to a request for a PIN blob (for example, block 414 of FIG. 4) or in response to an indication that the PIN applet has received the final PIN digit of the PIN.

The PIN applet begins with the PIN 602 in an unencrypted state. The PIN 602 includes each PIN digit of the PIN and is stored in a memory associated with the secure element. The PIN applet can verify that each PIN digit is associated with the same transactionID. Additionally, the PIN 602 can be the plain values of the PIN and may not require a proprietary format.

In some examples, the PIN applet can generate an intermediate PIN block A 604. The intermediate PIN block A 604 can be generated based at least on encrypting the PIN 602 using a symmetric key 606. As described herein, the symmetric key 606 can be randomly generated and may only be known by the PIN applet, the virtual terminal, and/or the secure element. In some examples, the symmetric key 606 can be the transaction key as described with reference to FIG. 3. As described herein, the symmetric key 606 can be encrypted by the asymmetric public key (for example, the rewrap backend public key) such that the symmetry key 606 can be decrypted by an entity that has the asymmetric private key (for example, the rewrap backend private key), such as the rewrap backend 350 of FIG. 3.

The PIN applet can generate an intermediate PIN block B 608. The intermediate PIN block B 608 can be generated based at least on performing an operation on the intermediate PIN block A 604 using the PAN 610. For example, the PIN applet can perform an exclusive-or Boolean operation (commonly referred to as an XOR operation) on the bits of the intermediate PIN block A 604 and the PAN 610 to generate the intermediate PIN block B 608. In some examples, the intermediate PIN block B 608 can be generated by performing an operation on the PIN block 602 using the PAN 610. For example, the PIN applet can perform an exclusive-or Boolean operation (commonly referred to as an XOR operation) on the bits of the PIN block 602 and the PAN 610 to generate the intermediate PIN block B 608. By performing the XOR on the PIN block 602 or the intermediate PIN block A 604, the PAN 610 would be needed by a service trying to decrypt the PIN from the PIN block 602 or the intermediate PIN block A 604. With reference to FIG. 3, any combination of: the DTSP 340, the DTP 360, and the rewrap backend 350 have the PAN 610 and can use the PAN 610 to decrypt the PIN block 664 or the intermediate PIN block A 604 to determine the PIN 602. For example, if the intermediate PIN Block B 608 was generated by performing an exclusive-or Boolean operation on the bits of the PIN block 602 and the PAN 610, performing another exclusive-or Boolean operation using the PAN 610 should decrypt the intermediate PIN Block B 608 to get the intermediate PIN Block A 604.

The PIN applet can generate the PIN block 664. The PIN block 664 can be generated by encrypting the intermediate PIN block B 608 with the symmetric key 606. In some examples, the symmetric key 606 can be the transaction key as described with reference to FIG. 3. In some examples, the symmetric key 606 is encrypted by an asymmetric public key (for example, the rewrap backend public key).

Figure 7:
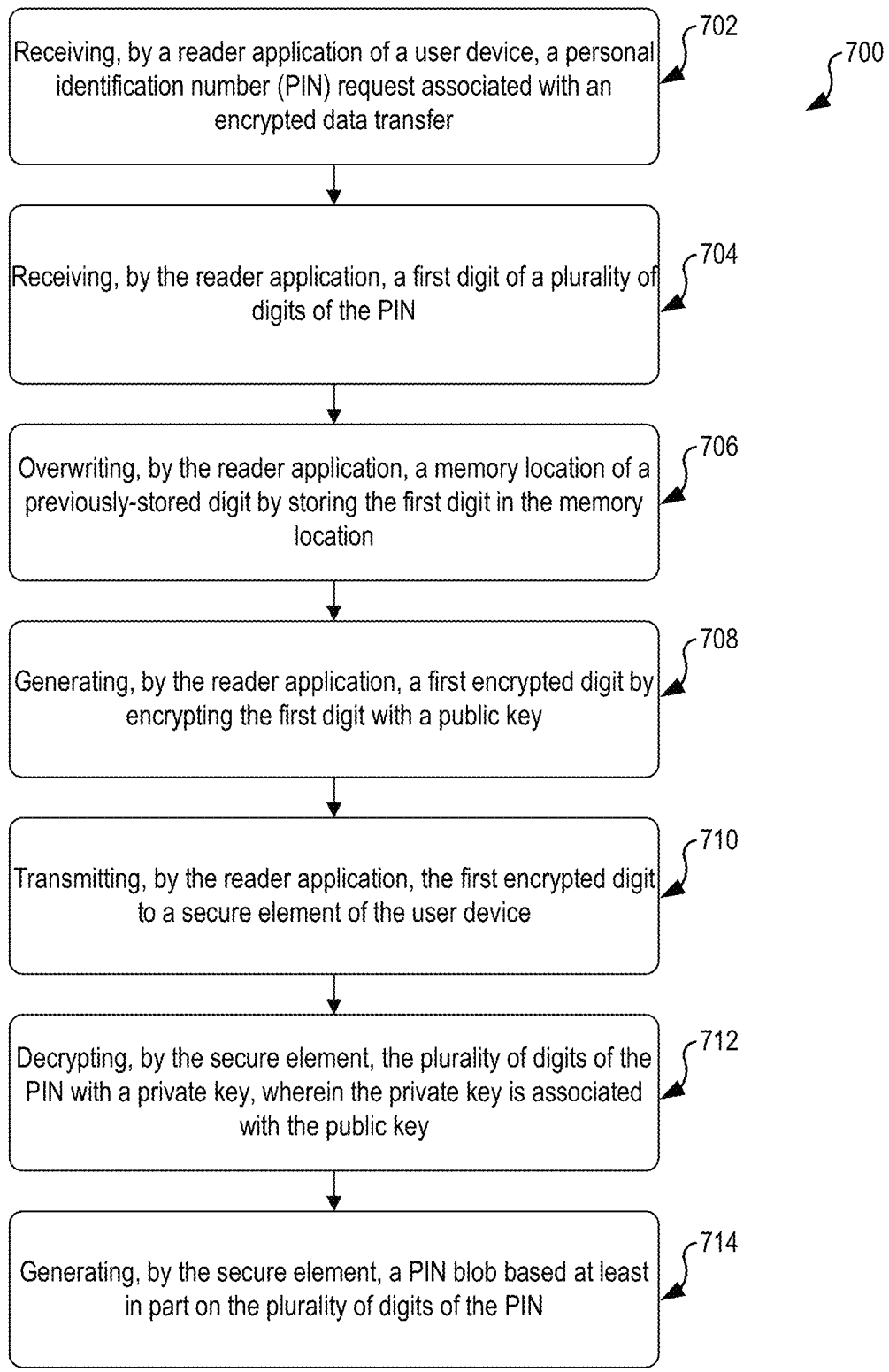
FIG. 7 illustrates a flow diagram for performing the techniques described herein, according to an embodiment of the present disclosure.

FIG. 7 illustrates a flow chart showing an example process 700 for techniques described herein is shown according to at least one example. Process 700 is illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

At block 702, process 700 can include receiving, by a reader application (for example, the reader 320 of FIG. 3) of a user device (for example, the device 310 of FIG. 3), a personal identification number (PIN) request associated with an encrypted data transfer. The encrypted data transfer can be authorized by a first server (for example, the DTSP 340 of FIG. 3). A second server (for example, the rewrap backend 350 of FIG. 3) can decrypt the PIN block.

At block 704, process 700 can include receiving, by the reader application, a first digit of a plurality of digits of the PIN. At block 706, process 700 can include overwriting, by the reader application, a memory location of a previously-stored digit of the plurality of digits by storing the first digit in the memory location. At block 708, process 700 can include generating, by the reader application, a first encrypted digit by encrypting the first digit with a public key.

At block 710, process 700 can include transmitting, by the reader application, the first encrypted digit to a secure element (for example, the secure element 324 of FIG. 3) of the user device. The secure element can be a part of the user device. The secure element can be a separate hardware module configured for security and cryptography. The secure element can be separate from the reader application and the associated application processor on the user device. The secure element can host a virtual terminal configured to generate the encrypted data payload including the instrument information and data transfer information.

At block 712, process 700 can include decrypting, by the secure element, the plurality of digits of the PIN with a private key. The private key can be associated with the public key.

At block 714, process 700 can include generating, by the secure element, a PIN blob based at least in part on the plurality of digits of the PIN. Generating the PIN blob can include receiving, by the secure element, instrument information related to the encrypted data transfer. Generating the PIN blob can include generating, by the secure element, a random symmetric key. Generating the PIN blob can include generating, by the secure element, a first intermediate PIN block based at least in part on the plurality of digits of the PIN, the instrument information, and the random symmetric key. Generating the PIN blob can include encrypting, by the secure element, the random symmetric key with an asymmetric public key. Generating the PIN blob can include generating, by the secure element, the PIN blob based at least in part on the first intermediate PIN block and the random symmetric key.

Process 700 can further include transmitting, by the reader application, a public key request for the public key to the secure element. Process 700 can further include transmitting, by the secure element, the public key to the reader application. Process 700 can further include receiving, by the reader application, the public key from the secure element. Process 700 can further include determining, by the secure element, that the secure element has the instrument information associated with the PIN based on a transaction identifier associated with the encrypted data transfer. The secure element can transmit the public key to the reader application based on a determination that the secure element has the instrument information associated with the PIN.

Illustrative methods, systems, and computer-readable media for enabling a virtual terminal for receiving touchless data transfers on a mobile device are described above. Some or all of these systems and methods may, but need not, be implemented at least partially by architectures such as those shown at least in FIGS. 1-8. While many of the examples are described above with reference to personal and/or payment-related information, it should be understood that any type of user information or non-user information (for example, data of any type) may be managed using these techniques. Further, in the foregoing description, various non-limiting examples were described. For purposes of explanation, specific configurations and details are set forth in order to provide a thorough understanding of the examples. However, it should also be apparent to one skilled in the art that the examples may be practiced without the specific details. Furthermore, well-known features were sometimes omitted or simplified in order not to obscure the example being described.

Figure 8:
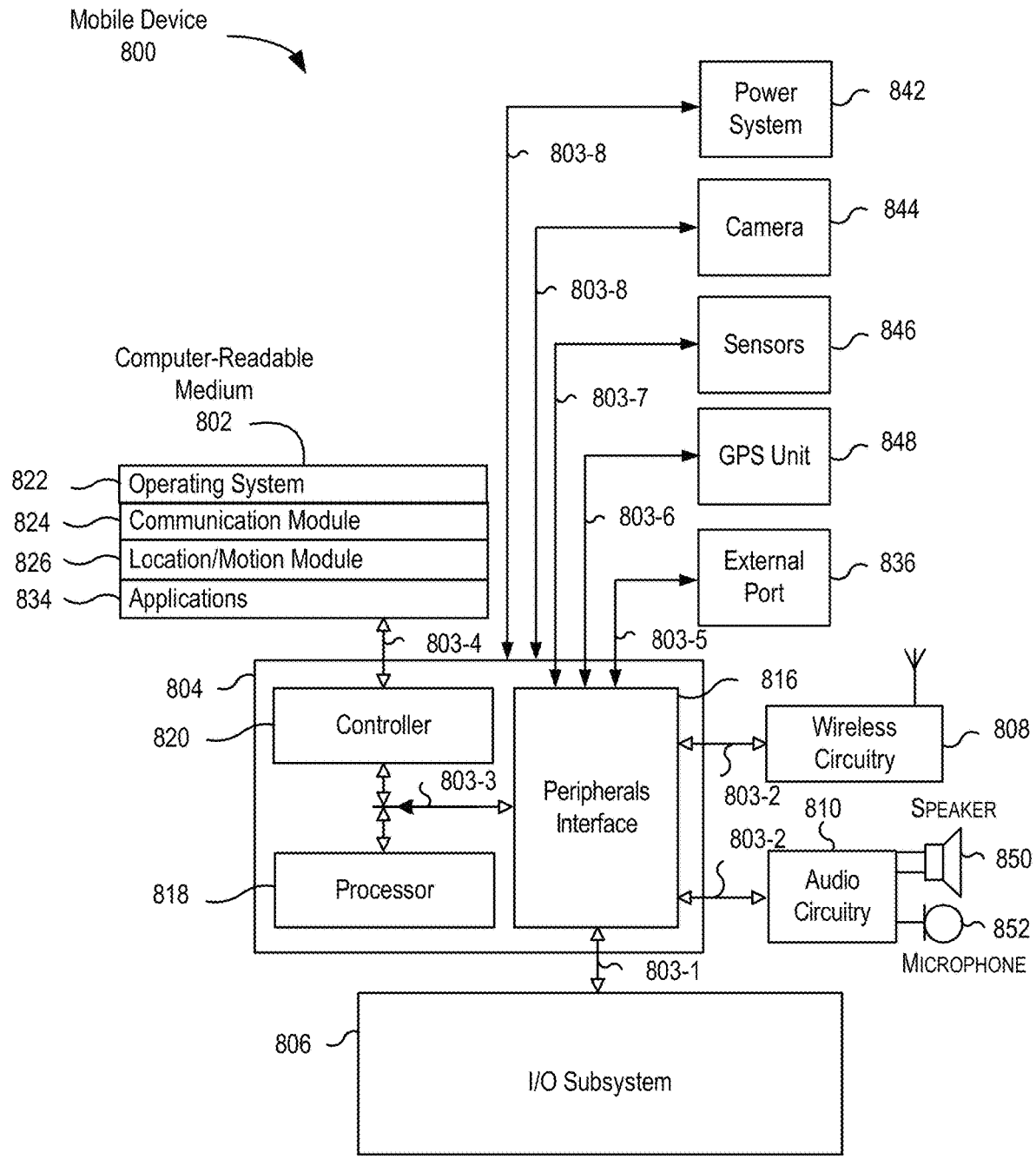
FIG. 8 illustrates an example architecture or environment configured to implement the techniques described herein, according to an embodiment of the present disclosure.

FIG. 8 is a block diagram of an example electronic device 800. Device 800 generally includes computer-readable medium 802, a processing system 804, an Input/Output (I/O) subsystem 806, wireless circuitry 808, and audio circuitry 810 including speaker 812 and microphone 814. These components may be coupled by one or more communication buses or signal lines 803. Device 800 can be any portable electronic device, including a handheld computer, a tablet computer, a mobile phone, laptop computer, tablet device, media player, personal digital assistant (PDA), a key fob, a car key, an access card, a multifunction device, a mobile phone, a portable gaming device, a headset, or the like, including a combination of two or more of these items.

It should be apparent that the architecture shown in FIG. 8 is only one example of an architecture for device 800, and that device 800 can have more or fewer components than shown, or a different configuration of components. The various components shown in FIG. 8 can be implemented in hardware, software, or a combination of both hardware and software, including one or more signal processing and/or application specific integrated circuits.

Wireless circuitry 808 is used to send and receive information over a wireless link or network to one or more other devices' conventional circuitry such as an antenna system, a radio frequency (RF) transceiver, one or more amplifiers, a tuner, one or more oscillators, a digital signal processor, a coder-decoder (CODEC) chipset, memory, etc. Wireless circuitry 808 can use various protocols, for example, as described herein. In various embodiments, wireless circuitry 808 is capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, Wi-Fi (such as Institute of Electrical and Electronics Engineers (IEEE) 802.11a, IEEE 802.11b, IEEE 802.11g and/or IEEE 802.11n), Bluetooth, Wi-MAX, Voice Over Internet Protocol (VoIP), near field communication protocol (NFC), a protocol for email, instant messaging, and/or a short message service (SMS), or any other suitable communication protocol, including communication protocols not yet developed as of the filing date of this document.

Wireless circuitry 808 is coupled to processing system 804 via peripherals interface 816. Peripherals interface 816 can include conventional components for establishing and maintaining communication between peripherals and processing system 804. Voice and data information received by wireless circuitry 808 (for example, in speech recognition or voice command applications) is sent to one or more processors 818 via peripherals interface 816. One or more processors 818 are configurable to process various data formats for one or more application programs 834 stored on medium 802.

Peripherals interface 816 couple the input and output peripherals of device 800 to the one or more processors 818 and computer-readable medium 802. One or more processors 818 communicate with computer-readable medium 802 via a controller 820. Computer-readable medium 802 can be any device or medium that can store code and/or data for use by one or more processors 818. Computer-readable medium 802 can include a memory hierarchy, including cache, main memory and secondary memory. The memory hierarchy can be implemented using any combination of a random-access memory (RAM) (for example, static random access memory (SRAM) dynamic random access memory (DRAM), double data random access memory (DDRAM)), read only memory (ROM), FLASH, magnetic and/or optical storage devices, such as disk drives, magnetic tape, CDs (compact disks) and DVDs (digital video discs). In some embodiments, peripherals interface 816, one or more processors 818, and controller 820 can be implemented on a single chip, such as processing system 804. In some other embodiments, they can be implemented on separate chips.

Processor(s) 818 can include hardware and/or software elements that perform one or more processing functions, such as mathematical operations, logical operations, data manipulation operations, data transfer operations, controlling the reception of user input, controlling output of information to users, or the like. Processor(s) 818 can be embodied as one or more hardware processors, microprocessors, microcontrollers, field programmable gate arrays (FPGAs), application-specified integrated circuits (ASICs), or the like. As noted above, the secure element 324 of FIG. 3 is separate from the processor 818 contemplated here.

Device 800 also includes a power system 842 for powering the various hardware components. Power system 842 can include a power management system, one or more power sources (for example, battery, alternating current (AC)), a recharging system, a power failure detection circuit, a power converter or inverter, a power status indicator (for example, a light emitting diode (LED)) and any other components typically associated with the generation, management and distribution of power in mobile devices.

In some embodiments, device 800 includes a camera 844. In some embodiments, device 800 includes sensors 846. Sensors can include accelerometers, compass, gyrometer, pressure sensors, audio sensors, light sensors, barometers, and the like. Sensors 846 can be used to sense location aspects, such as auditory or light signatures of a location.

In some embodiments, device 800 can include a GPS receiver, sometimes referred to as a GPS unit 848. A mobile device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 818 run various software components stored in medium 802 to perform various functions for device 800. In some embodiments, the software components include an operating system 822, a communication module 824 (or set of instructions), a location module 826 (or set of instructions), and other application programs 834 (or set of instructions).

Operating system 822 can be any suitable operating system, including iOS, Mac OS, Darwin, Real Time Operating System (RTXC), LINUX, UNIX, OS X, WINDOWS, or an embedded operating system such as VxWorks. The operating system can include various procedures, sets of instructions, software components and/or drivers for controlling and managing general system tasks (for example, memory management, storage device control, power management, etc.) and facilitates communication between various hardware and software components.

Communication module 824 facilitates communication with other devices over one or more external ports 836 or via wireless circuitry 808 and includes various software components for handling data received from wireless circuitry 808 and/or external port 836. External port 836 (for example, universal serial bus (USB), FireWire, Lightning connector, 60-pin connector, etc.) is adapted for coupling directly to other devices or indirectly over a network (for example, the Internet, wireless local area network (LAN), etc.).

Location/motion module 826 can assist in determining the current position (for example, coordinates or other geographic location identifiers) and motion of device 800. Modern positioning systems include satellite-based positioning systems, such as Global Positioning System (GPS), cellular network positioning based on "cell IDs," and Wi-Fi positioning technology based on a Wi-Fi networks. GPS also relies on the visibility of multiple satellites to determine a position estimate, which may not be visible (or have weak signals) indoors or in "urban canyons." In some embodiments, location/motion module 826 receives data from GPS unit 848 and analyzes the signals to determine the current position of the mobile device. In some embodiments, location/motion module 826 can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at wireless circuitry 808 and is passed to location/motion module 826. In some embodiments, the location module receives the one or more transmitter IDs. In some embodiments, a sequence of transmitter IDs can be compared with a reference database (for example, Cell ID database, Wi-Fi reference database) that maps or correlates the transmitter IDs to position coordinates of corresponding transmitters, and computes estimated position coordinates for device 800 based on the position coordinates of the corresponding transmitters. Regardless of the specific location technology used, location/motion module 826 receives information from which a location fix can be derived, interprets that information, and returns location information, such as geographic coordinates, latitude/longitude, or other location fix data.

The one or more applications 834 on device 800 can include any applications installed on the device 800, including without limitation, a browser, address book, contact list, email, instant messaging, social networking, word processing, keyboard emulation, widgets, JAVA-enabled applications, encryption, digital rights management, voice recognition, voice replication, a music player (which plays back recorded music stored in one or more files, such as MP3 or AAC files), the reader 320 of FIG. 3, the PIN User interface 322 of FIG. 3, the source application 312 of FIG. 3, etc. As noted above, different applications can be installed in the secure element 324 of FIG. 3. For example, the PIN applet 328 of FIG. 3 can be an application installed in the secure element 324 of FIG. 3. These applications in the secure element 324 of FIG. 3 are installed by the device manufacturer and may not be added and/or removed by the end user.

There may be other modules or sets of instructions (not shown), such as a graphics module, a time module, etc. For example, the graphics module can include various conventional software components for rendering, animating and displaying graphical objects (including without limitation text, web pages, icons, digital images, animations and the like) on a display surface. In another example, a timer module can be a software timer. The timer module can also be implemented in hardware. The time module can maintain various timers for any number of events.

I/O subsystem 806 can be coupled to a display system (not shown), which can be a touch-sensitive display. The display displays visual output to the user in a graphical user interface (GUI). The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 806 can include a display and user input devices such as a keyboard, mouse, and/or trackpad. In some embodiments, I/O subsystem 806 can include a touch-sensitive display. A touch-sensitive display can also accept input from the user based at least part on haptic and/or tactile contact. In some embodiments, a touch-sensitive display forms a touch-sensitive surface that accepts user input. The touch-sensitive display/surface (along with any associated modules and/or sets of instructions in computer-readable medium 802) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, I/O subsystem 806 can be coupled to one or more other physical control devices (not shown), such as push-buttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 800 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display, or an extension of the touch-sensitive surface formed by the touch-sensitive display.

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present disclosure may be created using a data signal encoded with such programs. Computer readable media encoded with the program code may be packaged with a compatible device or provided separately from other devices (for example, via Internet download). Any such computer readable medium may reside on or within a single computer program product (for example, a hard drive or an entire computer system), and may be present on or within different computer program products within a system or network. A computer system may include a monitor, printer, or other suitable display for providing any of the results mentioned herein to a user.

Computer programs incorporating various features of the present disclosure may be encoded on various computer readable storage media; suitable media include magnetic disk or tape, optical storage media, such as compact disk (CD) or DVD (digital versatile disk), flash memory, and the like. Computer readable storage media encoded with the program code may be packaged with a compatible device or provided separately from other devices. In addition, program code may be encoded and transmitted via wired optical, and/or wireless networks conforming to a variety of protocols, including the Internet, thereby allowing distribution, for example, via Internet download. Any such computer readable medium may reside on or within a single computer product (for example, a solid-state drive, a hard drive, a CD, or an entire computer system), and may be present on or within different computer products within a system or network. A computer system may include a monitor, printer, or other suitable display for providing any of the results mentioned herein to a user.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (for example, meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (for example, "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (for example, X, Y, and/or Z). Thus, such disjunctive language is not generally intended to, and should not, imply that certain examples require at least one of X, at least one of Y, or at least one of Z to each be present.

Preferred examples of this disclosure are described herein, including the best mode known to the inventors for carrying out the disclosure. Variations of those preferred examples may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

As described above, one aspect of the present technology is sharing personal and/or payment-related data between user devices, which may include storing some aspect of the data on a server. The present disclosure contemplates that in some instances, this gathered data may include personally identifiable information (PII) data that uniquely identifies or can be used to contact or locate a specific person. Such personal information data can include demographic data, location-based data, telephone numbers, email addresses, Twitter IDs, home addresses, data or records relating to a user's credit card information, date of birth, or any other identifying or personal or health information.

The present disclosure recognizes that the use of such personal information data, in the present technology, can be used to the benefit of users. For example, the personal information data can be used to process a data transfer or to pay for a transaction with a source. Further, other uses for personal information data that benefit the user are also contemplated by the present disclosure.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the U.S., collection of or access to certain health data may be governed by federal and/or state laws, such as the Health Insurance Portability and Accountability Act (HIPAA); whereas health data in other countries may be subject to other regulations and policies and should be handled accordingly. Hence, different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services or other services relating to health record management, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health-related applications, data de-identification can be used to protect a user's privacy. De-identification may be facilitated, when appropriate, by removing specific identifiers (for example, date of birth), controlling the amount or specificity of data stored (for example, collecting location data at a city level rather than at an address level), controlling how data is stored (for example, aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

What is claimed is:

1. A method, comprising:
   receiving, by a reader application of a user device, a personal identification number (PIN) request associated with an encrypted data transfer;
   receiving, by the reader application, a first digit of a plurality of digits of the PIN;
   overwriting, by the reader application, a memory location of a previously-stored digit of the plurality of digits by storing the first digit in the memory location;
   generating, by the reader application, a first encrypted digit by encrypting the first digit with a public key;
   transmitting, by the reader application, the first encrypted digit to a secure element of the user device;
   decrypting, by the secure element, the plurality of digits of the PIN with a private key, wherein the private key is associated with the public key; and
   generating, by the secure element, a PIN blob based at least in part on the plurality of digits of the PIN.

2. The method of claim 1, wherein the secure element is a hardware module configured for security and cryptography, and wherein the secure element is separate from the reader application and an associated application processor on the user device.

3. The method of claim 1, further comprising:
   transmitting, by the reader application, a public key request for the public key to the secure element; and
   transmitting, by the secure element, the public key to the reader application.

4. The method of claim 3, further comprising:
   determining, by the secure element, that the secure element has instrument information associated with the PIN based on a transaction identifier associated with the encrypted data transfer; and
   wherein the secure element transmits the public key to the reader application based on a determination that the secure element has the instrument information associated with the PIN.

5. The method of claim 1, wherein generating the PIN blob comprises:
   receiving, by the secure element, instrument information related to the encrypted data transfer;
   generating, by the secure element, a random symmetric key; and
   generating, by the secure element, a first intermediate PIN block based at least in part on the plurality of digits of the PIN, the instrument information, and the random symmetric key.

6. The method of claim 5, wherein generating the PIN blob further comprises:
   encrypting, by the secure element, the random symmetric key with an asymmetric public key; and
   generating, by the secure element, the PIN blob based at least in part on the first intermediate PIN block and the random symmetric key.

7. The method of claim 5, wherein the secure element hosts a virtual terminal configured to generate the encrypted data transfer including the instrument information and data transfer information.

8. The method of claim 1, wherein the encrypted data transfer is authorized by a first server, and wherein a second server decrypts the PIN blob.

9. A user device, comprising:
   one or more memories;
   one or more processors in communication with the one or more memories and configured to execute instructions stored in the one or more memories to cause the user device to:
     receive, by a reader application of the user device, a personal identification number (PIN) request associated with an encrypted data transfer;
     receive, by the reader application, a first digit a plurality of digits of the PIN;
     overwriting, by the reader application, a memory location of a previously-stored digit of the plurality of digits by storing the first digit in the memory location;
     generating, by the reader application, a first encrypted digit by encrypting the first digit with a public key;
     transmit, by the reader application, the first encrypted digit to a secure element of the user device; and
   a secure element configured to:
     decrypt the plurality of digits of the PIN with a private key, wherein the private key is associated with the public key; and
     generate a PIN blob based at least in part on the plurality of digits of the PIN.

10. The user device of claim 9, wherein the secure element is a hardware module configured for security and cryptography, and wherein the secure element is separate from a reader application, the one or more memories, and the one or more processors.

11. The user device of claim 9, wherein the one or more processors are further configured to transmit, by the reader application, a public key request for the public key to the secure element; and wherein the secure element is further configured to transmit the public key to the reader application.

12. The user device of claim 11, wherein secure element is further configured to:

determine that the secure element has instrument information associated with the PIN based on a transaction identifier associated with the encrypted data transfer; and wherein the secure element transmits the public key to the reader application based on a determination that the secure element has the instrument information associated with the PIN.

13. The user device of claim 9, wherein generating the PIN blob comprises:

receiving, by the secure element, instrument information related to the encrypted data transfer;

generating, by the secure element, a random symmetric key; and generating, by the secure element, a first intermediate PIN block based at least in part on the plurality of digits of the PIN, the instrument information, and the random symmetric key.

14. The user device of claim 13, wherein generating the PIN blob further comprises:

encrypting, by the secure element, the random symmetric key with an asymmetric public key; and generating, by the secure element, the PIN blob based at least in part on the first intermediate PIN block and the random symmetric key.

15. The user device of claim 13, wherein the secure element is configured to host a virtual terminal configured to generate the encrypted data transfer including the instrument information and data transfer information.

16. The user device of claim 9, wherein the encrypted data transfer is authorized by a first server, and wherein a second server decrypts the PIN blob.

17. A non-transitory computer-readable storage medium having stored thereon program instructions that, when executed by one or more processors of a user device, cause the user device to perform operations comprising:

receiving, by a reader application of the user device, a personal identification number (PIN) request associated with an encrypted data transfer;

receiving, by the reader application, a first digit a plurality of digits of the PIN;

overwriting, by the reader application, a memory location of a previously-stored digit of the plurality of digits by storing the first digit in the memory location;

generating, by the reader application, a first encrypted digit by encrypting the first digit with a public key;

transmitting, by the reader application, the first encrypted digit to a secure element of the user device; and receiving a PIN blob based at least in part on the plurality of digits, wherein the secure element is configured to decrypt the plurality of digits with a private key and generate the PIN blob based at least in part on the plurality of digits, wherein the private key is associated with the public key.

18. The non-transitory computer-readable storage medium of claim 17, wherein the secure element is part of the user device, wherein the secure element is a hardware module configured for security and cryptography, and wherein the secure element is separate from a reader application and an associated application processor on the user device.

19. The non-transitory computer-readable storage medium of claim 17, wherein operations further comprise:

transmitting, by the reader application, a public key request for the public key to the secure element; and receiving, by the reader application, the public key from the secure element.

20. The non-transitory computer-readable storage medium of claim 19, wherein the secure element is configured to determine that the secure element has instrument information associated with the PIN based on a transaction identifier associated with the encrypted data transfer; and wherein the secure element is further configured to transmit the public key to the reader application based on a determination that the secure element has the instrument information associated with the PIN.

* * * * *